United States Patent
Komma

(10) Patent No.: US 7,330,292 B2
(45) Date of Patent: Feb. 12, 2008

(54) COMPLEX OBJECTIVE LENS, OPTICAL HEAD, OPTICAL INFORMATION APPARATUS, COMPUTER, OPTICAL DISK PLAYER, CAR NAVIGATION SYSTEM, OPTICAL DISK RECORDER, AND OPTICAL DISK SERVER

(75) Inventor: Yoshiaki Komma, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 11/879,140

(22) Filed: Jul. 16, 2007

(65) Prior Publication Data

US 2007/0263516 A1  Nov. 15, 2007

Related U.S. Application Data

(62) Division of application No. 10/453,073, filed on Jun. 2, 2003, now Pat. No. 7,245,407.

(30) Foreign Application Priority Data

Jun. 10, 2002 (JP) .............................. 2002-168754

(51) Int. Cl.
*G02B 5/32* (2006.01)
(52) U.S. Cl. ................. 359/15; 369/112.1; 369/112.15; 365/216
(58) Field of Classification Search ...................... None
See application file for complete search history.

(56) References Cited

U.S. PATENT DOCUMENTS

| | | | |
|---|---|---|---|
| 5,111,448 A | 5/1992 | Komma et al. | |
| 5,289,451 A | 2/1994 | Ashinuma et al. | |
| 5,446,565 A | 8/1995 | Komma et al. | |
| 5,513,164 A | 4/1996 | Tanaka et al. | |

(Continued)

FOREIGN PATENT DOCUMENTS

| | | |
|---|---|---|
| EP | 0 610 055 | 8/1994 |
| EP | 0 731 459 | 9/1996 |
| EP | 0 747 893 | 12/1996 |
| EP | 0 831 466 | 3/1998 |
| EP | 0 936 604 | 8/1999 |
| EP | 1 001 414 | 5/2000 |

(Continued)

OTHER PUBLICATIONS

Katayama, et al., "Blue/DVD/CD Compatible Optical Head With Three Wavelengths and a Wavelength Selective Filter", International Symposium on Optical Memory 2001, Session We-C-04, pp. 30-31.

(Continued)

Primary Examiner—Stephone B. Allen
Assistant Examiner—Derek S. Chapel
(74) Attorney, Agent, or Firm—Hamre, Schumann, Mueller & Larson, P.C.

(57) ABSTRACT

A complex objective lens composed of a hologram and an objective lens, capable of realizing stable and high-precision compatible reproducing/recording of a BD with a base thickness of about 0.1 mm for a blue light beam (wavelength $\lambda 1$) and a DVD with a base thickness of about 0.6 mm for a red light beam (wavelength $\lambda 2$). In an inner circumferential portion of the hologram, a grating is formed. The hologram transmits a blue light beam as 0th-order diffracted light without diffracting it, and disperses a red light beam passing through an inner circumferential portion as +1st-order diffracted light and allows it to be condensed by an objective lens. Because of this, the focal length of the red light beam becomes longer than that of the blue light beam, whereby a working distance is enlarged.

13 Claims, 23 Drawing Sheets

U.S. PATENT DOCUMENTS

| | | | |
|---|---|---|---|
| 6,084,843 | A | 7/2000 | Abe et al. |
| 6,118,594 | A | 9/2000 | Maruyama |
| 6,166,854 | A | 12/2000 | Katsuma |
| 6,201,780 | B1 | 3/2001 | Katayama |
| 6,442,124 | B1 | 8/2002 | Chung et al. |
| 6,449,095 | B1 | 9/2002 | Ohtaki et al. |
| 6,515,805 | B2 | 2/2003 | Hagimori |
| 6,760,295 | B1 | 7/2004 | Maruyama |
| 6,834,036 | B1 | 12/2004 | Shiono et al. |
| 6,898,168 | B2 | 5/2005 | Kimura et al. |
| 6,928,035 | B2 | 8/2005 | Komma et al. |
| 6,992,967 | B2 | 1/2006 | Jeong |
| 7,190,650 | B2 | 3/2007 | Fujiune et al. |
| 2001/0000135 | A1 | 4/2001 | Mori et al. |
| 2003/0151996 | A1 | 8/2003 | Hendriks et al. |
| 2003/0227858 | A1 | 12/2003 | Komma |
| 2004/0090901 | A1 | 5/2004 | Katayama |
| 2004/0109242 | A1 | 6/2004 | Komma |
| 2004/0170106 | A1 | 9/2004 | Komma |
| 2005/0152036 | A1 | 7/2005 | Shiono et al. |

FOREIGN PATENT DOCUMENTS

| | | |
|---|---|---|
| EP | 1 500 956 | 1/2005 |
| JP | 7-98431 | 4/1995 |
| JP | 9-306018 | 11/1997 |
| JP | 10-106016 | 4/1998 |
| JP | 10-334504 | 12/1998 |
| JP | 11-23819 | 1/1999 |
| JP | 11-296890 | 10/1999 |
| JP | 11-339307 | 12/1999 |
| JP | 2000-81566 | 3/2000 |
| JP | 2000-260056 | 9/2000 |
| JP | 2001-6203 | 1/2001 |
| JP | 2001-43559 | 2/2001 |
| JP | 2001-60336 | 3/2001 |
| JP | 2001-93179 | 6/2001 |
| JP | 2001-209966 | 8/2001 |
| JP | 2002-237078 | 8/2002 |
| WO | WO 02/21522 | 3/2002 |
| WO | WO 02/082437 | 10/2002 |
| WO | WO 03/060891 | 7/2003 |

OTHER PUBLICATIONS

Nishioka, et al., "BD/DVD/CD Compatible Optical Pick-up Technology", Extend Abstracts (The 50th Spring Meeting 2003); The Japan Society of Applied Physics and Related Societies, 27 p-ZW-10, Kanagawa University, Mar. 2003.

N. Kaiho, et al., "DVD/CD Compatibility using Blu-ray Disc Pick Up", Extended Abstracts (The 63rd Autumn Meeting, 2002); The Japan Society of Applied Physics, No. 3, Sep. 2002, 27p-YD-5, pp. 1008 (with partial translation).

Katayama, et al., "Dual Wavelength Optical Head for 0.6mm and 1.2mm Substrate Thickness", Jpn. J, Appl. Phys., vol. 36 (1997) pp. 460-466.

FIG. 9A  Level Difference
$\lambda 1/(n_b-1)$
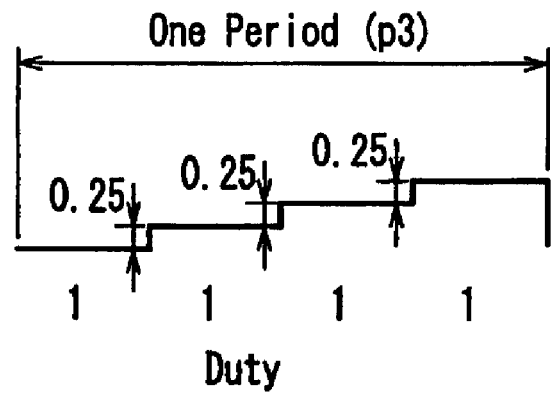
FIG. 9B
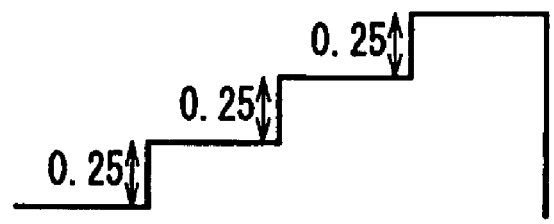
FIG. 9C
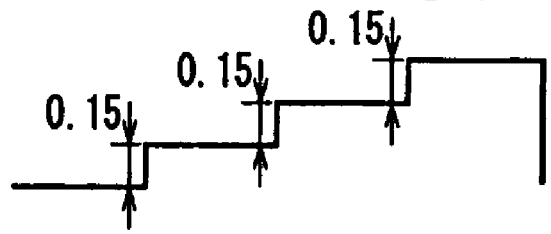

COMPLEX OBJECTIVE LENS, OPTICAL HEAD, OPTICAL INFORMATION APPARATUS, COMPUTER, OPTICAL DISK PLAYER, CAR NAVIGATION SYSTEM, OPTICAL DISK RECORDER, AND OPTICAL DISK SERVER

This application is a division of U.S. Ser. No. 10/453,073, filed Jun. 2, 2003 (anticipated U.S. Pat. No. 7,245,407) which application is incorporated herein by reference.

BACKGROUND OF THE INVENTION

1. Field of the Invention

The present invention relates to a complex objective lens in which an objective lens is combined with a hologram that is a diffraction element; an optical head for condensing light beams having a plurality of wavelengths onto an optical disk via the complex objective lens to record, reproduce, or delete information; an optical information apparatus in which the optical head is mounted; and a computer, an optical disk player, a car navigation system, an optical disk recorder and an optical disk server to which the optical information apparatus is applied.

2. Description of the Related Art

An optical memory technique using an optical disk having a pit-shaped pattern as a storage medium with a high density and a large capacity is being put to practical use while extending the range of uses to a digital audio disk, a video disk, a document file disk, and a data file. A function of recording/reproducing information with respect to an optical disk satisfactorily with high reliability, using a minutely condensed light beam, is roughly classified into a condensing function of forming a minute spot of a diffraction limit, focal point control (focus servo) and tracking control of an optical system, and detection of a pit signal (information signal).

Recently, because of the advancement of an optical system design technique and a decrease in wavelength of a semiconductor laser that is a light source, a high-density optical disk having a storage capacity larger than that of the prior art is being developed. As an approach to larger densities, an increase in a numerical aperture (NA) on an optical disk side of a condensing optical system that condenses a light beam minutely onto an optical disk is being studied. In this case, there is a problem that the amount of aberration caused by the inclination (i.e., tilt) of an optical axis is increased. When a NA is increased, the amount of aberration occurring with respect to a tilt also is increased. In order to prevent this, the thickness (base thickness) of a substrate of an optical disk should be made thinner.

A compact disk (CD) that may be a first generation optical disk uses infrared light (wavelength $\lambda 3$: 780 nm to 820 nm) and an objective lens with a NA of 0.45, and has a base thickness of 1.2 mm. ADVD that is a second generation optical disk uses red light (wavelength $\lambda 2$: 630 nm to 680 nm; standard wavelength: 660 nm) and an objective lens with a NA of 0.6, and has a base thickness of 0.6 mm. Furthermore, a third generation optical disk (hereinafter, referred to as a BD (Blue-ray Disk) uses blue light (wavelength $\lambda 1$: 390 nm to 415 nm; standard wavelength: 405 nm) and an objective lens with a NA of 0.85, and has a base thickness of 0.1 mm. In the present specification, the base thickness refers to a thickness from a surface of an optical disk (or an information medium) upon which a light beam is incident to an information recording surface.

Thus, the base thickness of an optical disk is decreased with an increase in density. In terms of economical points and a space occupied by an apparatus, there is a demand for an optical information apparatus capable of recording/reproducing information with respect to optical disks having different base thicknesses and recording densities. In order to achieve this, an optical head is required that is provided with a condensing optical system capable of condensing a light beam to a diffraction limit onto optical disks having different base thicknesses.

Furthermore, in the case where information is recorded/reproduced with respect to an optical disk having a thick base material, it is necessary to condense a light beam onto a recording surface that is positioned on a deeper side of the disk surface. Therefore, a focal length needs to be made larger.

JP 7(1995)-98431 A discloses a configuration intended to realize an optical head that records/reproduces information with respect to optical disks having different base thicknesses. This configuration will be described as a first conventional example with reference to FIGS. 25A and 25B.

In FIGS. 25A and 25B, reference numerals 40 and 41 denote an objective lens and a hologram, respectively. The hologram 41 is provided with a concentric grating pattern on a substrate transparent to an incident light beam 44.

The objective lens 40 has an numerical aperture NA of 0.6 or more, and as shown in FIG. 25A, is designed so as to allow 0th-order diffracted light 42 that passes through the hologram 41 without being diffracted to form a condensed spot of a diffraction limit on an optical disk 10, for example, having a base thickness (t2) of 0.6 mm. Furthermore, FIG. 25B shows that a condensed light spot of a diffraction limit can be formed on an optical disk 11 having a larger base thickness (t1) (i.e., 1.2 mm). In FIG. 25B, +1st-order diffracted light 43 diffracted by the hologram 41 is condensed onto the optical disk 11 by the objective lens 40. Herein, the +1st-order diffracted light 43 is subjected to aberration correction so as to be condensed to a diffraction limit through a substrate with a thickness t1.

Thus, by combining the hologram 41 that diffracts incident light with the objective lens 40, a 2-focal point lens is realized, which is capable of forming a condensed light spot that is condensed to a diffraction limit on the optical disks 10, 11 having different base thicknesses (t1 and t2), using diffracted light of different orders. Furthermore, it also is disclosed that, conversely to the above, the hologram 41 is designed so as to have a convex lens action, and 0th-order diffracted light is used for the optical disk 11 with the base thickness t1, and +1st-order diffracted light is used with respect to the optical disk 10 with the base thickness t2, whereby a fluctuation in a focal point position can be reduced with respect to a wavelength fluctuation during recording/reproducing of information with respect to the optical disk having the base thickness t2.

There also is a disclosure of a configuration intended for compatible reproducing of information with respect to optical disks having different kinds, using light beams having a plurality of wavelengths. As a second conventional example, a configuration in which a wavelength selection phase plate is combined with an objective lens is disclosed by JP 10(1998)-334504 A and Session We-C-05 of ISOM2001 (page 30 of the preprints). The configuration disclosed by Session We-C-05 of ISOM2001 (Page 30 of the preprints) will be described with reference to FIGS. 26, 27A and 27B.

FIG. 26 is a cross-sectional view showing a schematic configuration of an optical head as the second conventional example. In FIG. 26, parallel light output from a blue light optical system 51 having a blue light source (not shown) with a wavelength λ1 of 405 nm passes through a beam splitter 161 and a wavelength selection phase plate 205 and is condensed onto an information recording surface of an optical disk 9 (third generation optical disk: BD) with a base thickness of 0.1 mm by an objective lens 50. The light reflected from the optical disk 9 follows a reverse path and is detected by a detector (not shown) of the blue light optical system 51. On the other hand, divergent light output from a red light optical system 52 having a red light source (not shown) with a wavelength λ2 of 660 nm is reflected by the beam splitter 161, passes through the wavelength selection phase plate 205, and is condensed onto the information recording surface of an optical disk 10 (second generation optical disk: DVD) with a base thickness of 0.6 mm by the objective lens 50. Light reflected from the optical disk 10 follows a reverse path and is detected by a detector (not shown) of the red light optical system 52.

The objective lens 50 is designed so as to allow parallel light to pass through the optical disk 9 with the base thickness of 0.1 mm to be condensed. Therefore, for recording/reproducing of information with respect to the DVD with the base thickness of 0.6 mm, spherical aberration is caused by the difference in base thickness. In order to correct the spherical aberration, a light beam output from the red light optical system 52 is formed into dispersed light, and the wavelength selection phase plate 205 is used. When dispersed light is incident upon the objective lens 50, new spherical aberration occurs. Therefore, the spherical aberration caused by the difference in base thickness is cancelled by the new spherical aberration, and a wavefront is corrected by the wavelength selection phase plate 205.

FIGS. 27A and 27B respectively are a plan view and a cross-sectional view of the wavelength selection phase plate 205 in FIG. 26. The wavelength selection phase plate 205 is configured with a level difference 205a between heights h and 3 h, assuming that the refractive index at a wavelength λ1 is n1, and h=λ1/(n1−1). The optical path difference caused by the level difference of the height h is a use wavelength λ1, which corresponds to a phase difference 2π. This case is the same as the phase difference of 0. Therefore, the level difference of the height h does not influence the phase distribution of a light beam with a wavelength λ1, and does not influence recording and reproducing of information with respect to the optical disk 9 (FIG. 26). On the other hand, assuming that the refractive index of the wavelength selection phase plate 205 at a wavelength λ2 is n2, h×(n2−1)/λ2≈0.6, i.e., an optical path difference that is not an integral multiple of a wavelength occurs. The above-mentioned aberration correction is performed by using a phase difference caused by the optical path difference.

Furthermore, as a third conventional example, JP 11(1999)-296890 A and the like disclose a configuration in which a plurality of objective lenses are switched mechanically.

Furthermore, as a fourth conventional example, JP 11(1999)-339307 A discloses a configuration in which a mirror having a reflective surface with different radii of curvature also functions as a rising mirror (changing the direction of light from a horizontal direction to a vertical direction so that the light is incident upon an optical disk) that bends an optical axis.

As a fifth conventional example, JP 2000-81566 A discloses a configuration in which a refraction type objective lens is combined with a hologram in the same way as in the first conventional example, and the difference in base thickness is corrected by using chromatic aberration caused by diffracted light of the same order as that of light having a different wavelength.

As a sixth conventional example, as shown in FIG. 28, a configuration in which a refraction type objective lens 281 is combined with a hologram 282 having a diffraction surface and a refraction surface is described in "BD/DVD/CD Compatible Optical Pickup Technique" by Sumito Nishioka (Extended Abstracts (50th Spring Meeting); The Japan Society of Applied Physics, 27p-ZW-10 (Kanagawa University, March 2003)) (published after filing of the priority application of the present application). In the sixth conventional example, the hologram 282 is allowed to generate +2nd-order diffracted light with respect to a blue light beam and +1st-order diffracted light with respect to a red light beam, whereby chromatic aberration correction is performed. Furthermore, dispersed light is allowed to be incident upon the hologram 282 and the objective lens 281 with respect to a blue light beam, and converged light is allowed to be incident upon them with respect to a red light beam, whereby spherical aberration caused by a difference in base thickness is corrected.

The above-mentioned first conventional example proposes at least the following three technical ideas. First, the compatibility of optical disks having different base thicknesses is realized by using the diffraction of a hologram. Second, the design of an inner/outer periphery is changed to form condensed light spots having different NAs. Third, a focal point position of a condensed light spot is changed with respect to optical disks having different base thicknesses by using the diffraction of a hologram. These technical ideas do not limit the wavelength of light to be emitted by a light source.

Herein, a DVD that is the second generation optical disk includes a two-layer disk having two recording surfaces. The recording surface (first recording surface) on a side closer to an objective lens needs to allow light to pass through to a surface away from the objective lens, so that its reflectivity is set at about 30%. However, this reflectivity is guaranteed only with respect to red light, and is not guaranteed at the other wavelengths. Therefore, in order to exactly reproduce information from a DVD, it is required to use red (wavelength λ2=630 nm to 680 nm) light. Furthermore, in recording/reproducing of information with respect to a BD that is the third-generation optical disk, it is required to use blue (wavelength λ1=390 nm to 415 nm) light so as to decrease the diameter of a condensed light spot sufficiently. Thus, the first conventional example does not disclose the configuration in which a light use efficiency is enhanced further when different kinds of optical disks are made compatible using, in particular, red light and blue light.

Furthermore, the first conventional example discloses an example in which a hologram is formed in a convex lens type, and +1st-order diffracted light is used, whereby the movement of a focal point position due to a change in wavelength is reduced with respect to one kind of optical disk. However, the first conventional example does not disclose a scheme of reducing simultaneously the movement of a focal point position caused by a change in wavelength with respect to each of at least two kinds of optical disks.

The second conventional example uses a wavelength selection phase plate as a compatible element. When information is recorded/reproduced with respect to a disk having a large base thickness, a recording surface is positioned away from an objective lens by the base thickness. Therefore, it is required to increase a focal length. The focal length can be increased by providing the compatible element with a lens power. However, the wavelength selection phase plate does not have a lens power. Furthermore, as in the second conventional example, when it is attempted to realize all the lens powers with respect to dispersed red light, a large aberration occurs while an objective lens is moved (e.g., follows a track), resulting in degradation of recording/reproducing characteristics.

In the third conventional example, since objective lenses are switched, it is required to use a plurality of objective lenses, which increases the number of parts, and makes it difficult to miniaturize an optical head. Furthermore, the requirement of a switching mechanism also makes it difficult to miniaturize an apparatus.

In the fourth conventional example, an objective lens is driven independently of a mirror (see FIGS. 4 to 6 in JP 11(1999)-339307 A). However, a light beam is converted from parallel light by a mirror having the above-mentioned radius of curvature. Therefore, when the objective lens is moved by track control or the like, the relative position of the objective lens with respect to an incident light wavefront is changed, aberration occurs, and condensing characteristics are degraded. Furthermore, the reflective surface of a mirror is composed of a surface having a radius of curvature (i.e., a spherical surface); however, the spherical surface is not sufficient for correcting the difference in base thickness and the difference in wavelength, and high-order aberration (5th-order or higher) cannot be reduced sufficiently.

When the fifth conventional example is applied directly to a red light beam and a blue light beam, diffraction efficiencies of the same order cannot be enhanced simultaneously because of a large difference in wavelength, and consequently, the use efficiency of light is decreased.

In the sixth conventional example, dispersed light is allowed to be incident upon a hologram and an objective lens with respect to a blue light beam and converged light to be incident upon them with respect to a red light beam. Therefore, under the condition of focusing i.e., under the condition that a condensed light spot of a diffraction limit is formed on an information recording surface of an optical disk), a light beam reflected to be returned from an optical disk also becomes different in a parallel degree between a blue light beam and a red light beam, and a photodetector for detecting a servo signal cannot be shared between a blue light beam and a red light beam. More specifically, at least two photodetectors are required, which increase the number of parts, leading to an increase in cost.

SUMMARY OF THE INVENTION

Therefore, with the foregoing in mind, it is an object of the present invention to provide a complex objective lens having a high light use efficiency, that realizes compatible reproducing and compatible recording between an optical disk designed for a red light beam with a wavelength $\lambda 2$ (typically, about 660 nm) at a base thickness 0.6 mm and an optical disk designed for a blue light beam at a wavelength $\lambda 1$ (typically, about 405 nm) at a base thickness of 0.1 mm.

It is another object of the present invention to provide an optical information apparatus capable of handling a plurality of optical disks having different recording densities with a single optical head by mounting an optical head using the above-mentioned complex objective lens.

It is still another object of the present invention to provide a computer, an optical player, a car navigation system, an optical disk recorder, and an optical disk server capable of recording/reproducing information stably by selection of different kinds of optical disks in accordance with the use, by including the above-mentioned optical information apparatus.

In order to achieve the above-mentioned object, a first complex objective lens according to the present invention includes a hologram and a refraction type lens, wherein the hologram has a grating with a stepped cross-section, a level difference of the stepped cross-section is an integral multiple of a unit level difference d1, the unit level difference d1 gives a difference in optical path length of about one wavelength to a first light beam having a wavelength $\lambda 1$ in a range of 390 nm to 415 nm, and one period of the grating is composed of a step of heights in an order of 0 time, twice, once, and three times the unit level difference d1 from an outer peripheral side to an optical axis side of the hologram.

In the first complex objective lens, a ratio of widths of the level difference of the stepped cross-section of the grating is 2:3:3:2 corresponding to the heights in the order of 0 time, twice, once, and three times the unit level difference d1.

Furthermore, in the first complex objective lens, the grating is formed only in an inner circumferential portion of the hologram.

Furthermore, the first complex objective lens condenses 0th-order diffracted light of the first light beam through a base with a thickness t1 and condenses 1st-order diffracted light of a second light beam having a wavelength $\lambda 2$ in a range of 630 nm to 680 nm through a base with a thickness t2 larger than the thickness t1.

In order to achieve the above-mentioned object, a second complex objective lens according to the present invention includes a hologram and a refraction type lens, wherein the hologram has a grating with a stepped cross-section formed in at least an inner circumferential portion, a level difference of the stepped cross-section is an integral multiple of a unit level difference d2, the unit level difference d2 gives a difference in optical path length of about 1.25 wavelengths to a first light beam having a wavelength $\lambda 1$ in a range of 390 nm to 415 nm, and one period of the grating is composed of a step of heights in an order of 0 time, once, twice, and three times the unit level difference d2 from an outer peripheral side to an optical axis side of the hologram.

In the second complex objective lens, a ratio of widths of the level difference of the stepped cross-section of the grating is 1:1:1:1 corresponding to the heights in the order of 0 time, once, twice, and three times the unit level difference d2.

Furthermore, in the second complex objective lens, the hologram has a grating with a stepped cross-section formed in an outer peripheral portion, a level difference of the stepped cross-section of the grating formed in the outer peripheral portion is an integral multiple of a unit level difference d3, the unit level difference d3 gives a difference in optical path length of about 0.25 wavelengths to the first light beam, and one period of the grating formed in the outer peripheral portion is composed of a step of heights in an order of 0 time, once, twice and three times the unit level difference d3 from an outer peripheral side to an optical axis side of the hologram.

Furthermore, the second complex objective lens condenses +1st-order diffracted light of the first light beam through a base with a thickness t1 and condenses −1st-order diffracted light of a second light beam having a wavelength $\lambda 2$ in a range of 630 nm to 680 nm passing through a grating formed in an inner circumferential portion of the hologram through a base with a thickness t2 larger than the thickness t1.

In order to achieve the above-mentioned object, a third complex objective lens according to the present invention includes a hologram and a refraction type lens, wherein the hologram has a grating with a sawtooth cross-section formed in at least an inner circumferential portion, and a depth h1 of the sawtooth cross-section gives a difference in optical path length of about 2 wavelengths to a first light beam having a wavelength $\lambda 1$ in a range of 390 nm to 415 nm to allow the first light beam to generate +2nd-order diffracted light most strongly, and allows a second light beam having a wavelength $\lambda 2$ in a range of 630 nm to 680 nm to generate +1st-order diffracted light most strongly.

In order to achieve the above-mentioned object, a fourth complex objective lens according to the present invention includes a hologram and a refraction type lens, wherein the hologram has a grating with a sawtooth cross-section formed in at least an inner circumferential portion, and a depth h2 of the sawtooth cross-section gives a difference in optical path length of about one wavelength to a second light beam having a wavelength $\lambda 2$ in a range of 630 nm to 680 nm to allow the second light beam to generate +1st-order diffracted light most strongly, and allows a first light beam having a wavelength $\lambda 1$ in a range of 390 nm to 415 nm to generate +2nd-order diffracted light most strongly.

In order to achieve the above-mentioned object, a fifth complex objective lens according to the present invention includes a hologram and a refraction type lens, wherein the hologram has a grating with a sawtooth cross-section formed in at least an inner circumferential portion, and a depth h4 of the sawtooth cross-section gives a difference in optical path length larger than 1.7 wavelengths and smaller than 2 wavelengths to a first light beam having a wavelength $\lambda 1$ in a range of 390 nm to 415 nm to allow the first light beam to generate +2nd-order diffracted light most strongly, and allows a second light beam having a wavelength $\lambda 2$ in a range of 630 nm to 680 nm to generate +1st-order diffracted light most strongly.

In the fifth complex objective lens, it is preferable that the depth h4 of the sawtooth cross-section gives a difference in optical path length of 1.9 wavelengths to the first light beam.

In order to achieve the above-mentioned object, a sixth complex objective lens according to the present invention includes a hologram and a refraction type lens, wherein the hologram allows a first light beam having a wavelength $\lambda 1$ in a range of 390 nm to 415 nm to generate +2nd-order diffracted light most strongly and allows a second light beam having a wavelength $\lambda 2$ in a range of 630 nm to 680 nm to generate +1st-order diffracted light most strongly, and the refraction type lens condenses the +2nd-order diffracted light of the first light beam via the hologram through a base with a thickness t1, and condenses +1st-order diffracted light of the second light beam via an inner circumferential portion of the hologram through a base with a thickness t2 larger than the thickness t1.

In the third to sixth complex objective lenses, the hologram has a grating with a sawtooth cross-section formed in an outer peripheral portion, and a depth h3 of the sawtooth cross-section of the grating formed in the outer peripheral portion gives a difference in optical path length of about one wavelength to the first light beam to allow the first light beam to generate +1st-order diffracted light most strongly, and allows the second light beam to generate +1st-order diffracted light most strongly.

In the second to sixth complex objective lenses, the hologram is configured so as to have a function as a convex lens in order to reduce a change in a focal length with respect to a change in the wavelength $\lambda 1$ in a case of condensing the first light beam through a base with a thickness t1.

In the first to sixth complex objective lenses, in order to place a focal point position on an optical disk side away from the complex objective lens, the hologram is configured so as to have a larger function as a convex lens compared with the case of condensing the second light beam passing through an inner circumferential portion of the hologram through the base with the thickness t2, in a case of condensing the first light beam through the base with the thickness t1, or the hologram is configured so as to have a smaller function as a convex lens compared with a case of condensing the first light beam through the base with the thickness t1, in a case of condensing the second light beam passing through the inner circumferential portion of the hologram through the base with the thickness t2. Because of this, the focal point position on the optical disk side can be placed away from the complex objective lens, i.e., a working distance can be enlarged.

In the third to sixth complex objective lenses, a cross-sectional shape of the grating constituting the hologram is a sawtooth shape with a base forming the hologram having a slope on an outer peripheral side.

In the first to sixth complex objective lenses, it is preferable that the hologram and the refraction type lens are fixed integrally.

Alternatively, in the first to sixth complex objective lenses, it is preferable that a refractive surface of the refraction type lens on an opposite side of a condensed spot is an aspherical surface. In this case, it is preferable that the hologram is formed integrally on the aspherical surface of the refraction type lens.

Alternatively, in the first to sixth complex objective lenses, the hologram is formed integrally on a surface of the refraction type lens.

In the first to sixth complex objective lenses, assuming that a numerical aperture at which the first light beam is condensed through the base with the thickness t1 is NAb, and a numerical aperture at which the second light beam is condensed through the base with the thickness t2 is NAr, NAb>NAr is satisfied.

In order to achieve the above-mentioned object, an optical head apparatus according to the present invention includes: a first laser light source for emitting a first light beam having a wavelength $\lambda 1$ in a range of 390 nm to 415 nm; a second laser light source for emitting a second light beam having a wavelength $\lambda 2$ in a range of 630 nm to 680 nm; one of the first to sixth complex objective lenses for receiving the first light beam emitted from the first laser light source to condense it onto a recording surface of a first optical disk through a base with a thickness t1, and receiving the second light beam emitted from the second laser light source to condense it onto a recording surface of a second optical disk through a base with a thickness t2 larger than the thickness t1; and a photodetector for receiving the first and second light beams reflected respectively from the recording surfaces of the first and second optical disks to output an electric signal in accordance with light amounts of the first and second light beams.

It is preferable that the optical head apparatus according to the present invention includes a collimator lens that collimates the first and second light beams respectively emitted from the first and second laser light sources, wherein when the second light beam is condensed onto the recording surface of the second optical disk, the collimator lens is placed closer to the second laser light source side to convert the second light beam to divergent light so as to allow it to be incident upon the complex objective lens, whereby a focal point position on the second optical disk side is placed away from the complex objective lens.

In the optical head apparatus according to the present invention, the first and second laser light sources are placed so that both lighting points thereof have an image-forming relationship with respect to focal point positions of the complex objective lens on the first and second optical disk sides, and the photodetector is provided so as to be shared by the first and second light beams respectively reflected from the recording surfaces of the first and second optical disks and receives the first and second light beams to detect a servo signal.

In order to achieve the above-mentioned object, an optical information apparatus according to the present invention includes: the optical head apparatus according to the present invention; a motor for rotating the first and second optical disks; and an electric circuit for receiving a signal obtained from the optical head apparatus and driving the motor, the complex objective lens, and the first and second laser light sources based on the signal.

In the optical information apparatus according to the present invention, the optical head apparatus includes a collimator lens that collimates the first and second light beams respectively emitted from the first and second laser light sources, and when the second optical disk having a base with a thickness t2 of 0.6 mm is mounted, the optical information apparatus according to the present invention moves the collimator lens to the second laser light source side.

In order to achieve the above-mentioned object, a computer according to the present invention includes: the optical information apparatus according to the present invention; an input apparatus for inputting information; an arithmetic unit for performing an arithmetic operation based on information input from the input apparatus and information reproduced from the optical information apparatus; and an output apparatus for displaying or outputting the information input from the input apparatus, the information reproduced from the optical information apparatus, and a result of the arithmetic operation by the arithmetic unit.

In order to achieve the above-mentioned object, an optical disk player according to the present invention includes: the optical information apparatus according to the present invention; and a decoder for converting an information signal obtained from the optical information apparatus to an image signal.

In order to achieve the above-mentioned object, a car navigation system according to the present invention includes: the optical information apparatus according to the present invention; and a decoder for converting an information signal obtained from the optical information apparatus to an image signal.

In order to achieve the above-mentioned object, an optical disk recorder according to the present invention includes: the optical information apparatus according to the present invention; and an encoder for converting an image signal to an information signal to be recorded in the optical information apparatus.

In order to achieve the above-mentioned object, an optical disk server according to the present invention includes: the optical information apparatus according to the present invention; and an input/output terminal for recording an information signal input from outside in the optical information apparatus and outputting an information signal reproduced from the optical information apparatus to outside.

These and other advantages of the present invention will become apparent to those skilled in the art upon reading and understanding the following detailed description with reference to the accompanying figures.

BRIEF DESCRIPTION OF THE DRAWINGS

FIG. 9A is a cross-sectional view showing a stepped shape in one period (p3) of a grating formed in an outer peripheral potion 133C of the hologram 133.

FIG. 9B shows a phase modulation amount with respect to the blue light beam 61 (wavelength $\lambda 1$) corresponding to FIG. 9A.

FIG. 9C shows a phase modulation amount with respect to the red light beam 62 (wavelength $\lambda 2$) corresponding to FIG. 9A.

DESCRIPTION OF THE PREFERRED EMBODIMENTS

Hereinafter, the present invention will be described by way of illustrative embodiments with reference to the drawings.

Embodiment 1

Figure 1:
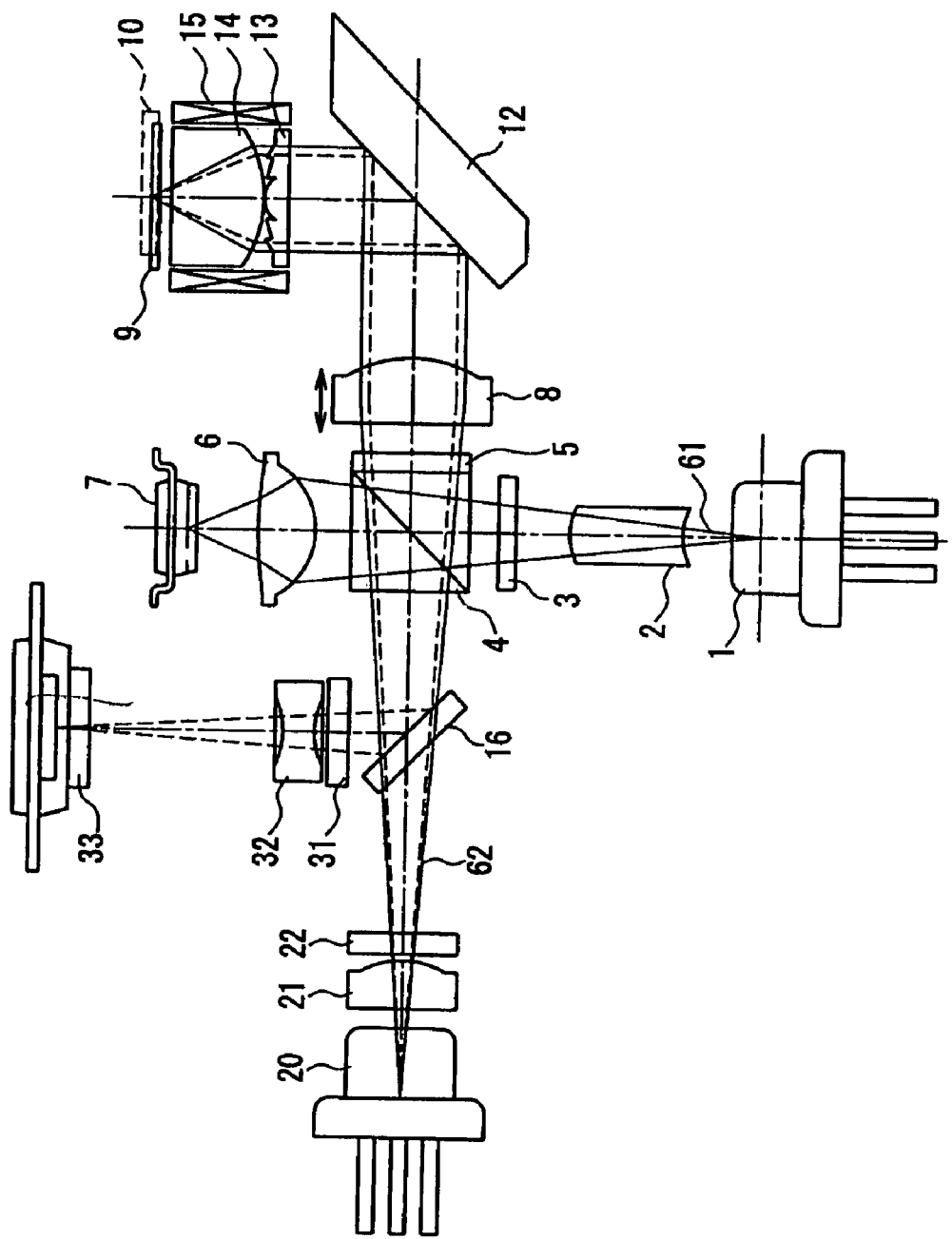
FIG. 1 is a cross-sectional view showing one exemplary configuration of an optical head according to Embodiment 1 of the present invention.

FIG. 1 is a cross-sectional view showing one exemplary configuration of an optical head according to Embodiment 1 of the present invention. In FIG. 1, reference numeral 1 denotes a blue laser light source as a first laser light source for emitting a first light beam having a wavelength λ1 (390 nm to 415 nm: in general, 405 nm is used often, so that a wavelength of 390 nm to 415 nm will be collectively referred to as "about 405 nm"); 20 denotes a red laser light source as a second laser light source for emitting a second light beam having a wavelength λ2 (630 nm to 680 nm: in general, 660 nm is used often, so that a wavelength of 630 nm to 680 nm will be collectively referred to as "about 660 nm"); 8 denotes a collimator lens; 12 denotes a rising mirror that bends an optical axis; 13 denotes a hologram (diffraction type optical element); and 14 denotes an objective lens as a refraction type lens. Herein, the hologram 13 and the objective lens 14 constitute a complex objective lens in the present embodiment.

Reference numeral 9 denotes a BD (first optical disk) that is a third generation optical disk, which has a base thickness t1 of about 0.1 mm (a base thickness of 0.06 mm to 0.11 mm will be collectively referred to as "about 0.1 mm") or less and with respect to which information is recorded/reproduced with a first light beam having a wavelength λ1. 10 denotes a second generation optical disk (second optical disk) such as a DVD, which has a base thickness t2 of about 0.6 mm (a base thickness of 0.54 mm to 0.65 mm will be collectively referred to as "about 0.6 mm") and with respect to which information is recorded/reproduced with a second light beam having a wavelength λ2. Regarding the first optical disk 9 and the second optical disk 10, only a base from a light incident surface to a recording surface is shown. However, actually, in order to enhance mechanical strength and set the outer size to be 1.2 mm that is the same size as that of a CD, a protective plate is attached to the first optical disk 9 and the second optical disk 10. A protective member with a thickness of 0.6 mm is attached to the second optical disk 10. A protective member with a thickness of 1.1 mm is attached to the first optical disk 9. In the figures referred to through the respective embodiments, the protective member is omitted for simplifying illustration.

The blue laser light source 1 and the red laser light source 20 are preferably semiconductor laser light sources. Because of this, an optical head and an optical information apparatus using the same can be miniaturized and reduced in weight and power consumption.

When information is recorded/reproduced with respect to the first optical disk 9 with the highest recording density, a blue light beam 61 with a wavelength $\lambda 1$ emitted from the blue laser light source 1 is reflected by a beam splitter 4 and circularly polarized by a ¼ wavelength plate 5. The ¼ wavelength plate 5 is designed so as to function as a ¼ wavelength plate with respect to both the blue light beam 61 with a wavelength $\lambda 1$ and the red light beam 62 with a wavelength $\lambda 2$. The blue light beam 61 passing through the ¼ wavelength plate 5 is substantially collimated by the collimator lens 8, has its optical axis bent by the rising mirror 12, and is condensed onto an information recording surface 91 (see FIG. 2) through the base with a thickness of about 0.1 mm of the first optical disk 9 by the hologram 13 and the objective lens 14.

The blue light beam 61 reflected from the information recording surface 91 follows the previous optical path in a reverse direction (return path), is linearly polarized in a direction orthogonal to the initial direction by the ¼ wavelength plate 5, passes through the beam splitter 4 substantially totally, is totally reflected by a beam splitter 16, is diffracted by a detection hologram 31, has its focal length increased by a detection lens 32, and is incident upon a photodetector 33. By operating an output signal from the photodetector 33, a servo signal and an information signal used for focal point control and tracking control are obtained.

As described above, the beam splitter 4 is a polarized light separation film that totally reflects linearly polarized light in one direction and totally transmits linearly polarized light in a direction orthogonal thereto with respect to the blue light beam with a wavelength $\lambda 1$. Furthermore, the beam splitter 4 totally transmits the red light beam 62 emitted from the red laser light source 20 with respect to the red light beam with a wavelength $\lambda 2$, as described later. Thus, the beam splitter 4 is an optical path branching element having wavelength selectivity together with polarization characteristics.

Next, when information is recorded/reproduced with respect to the second optical disk 10, the red light beam 62 with a wavelength $\lambda 2$, which is substantially linearly polarized light emitted from the red laser light source 20, passes through the beam splitters 16 and 4, substantially collimated by the collimator lens 8, has its optical axis bent by the rising mirror 12, and is condensed onto an information recording surface 101 (see FIG. 2) through a base with a thickness of about 0.6 mm of the second optical disk 10 by the hologram 13 and the objective lens 14.

The red light beam reflected from the information recording surface 101 follows the previous optical path in a reverse direction (return path), totally passes through the beam splitter 4, is totally reflected by the beam splitter 16, is diffracted by the detection hologram 31, has its focal length increased by the detection lens 32, and is incident upon the photodetector 33. By operating an output signal from the photodetector 33, a servo signal and an information signal used for focal point control and tracking control are obtained.

As described above, in order to obtain a servo signal for the first optical disk 9 and the second optical disk 10 from the common photodetector 33, the blue laser light source 1 and the red laser light source 20 are placed so that their lighting points have an image-forming relationship with a common position on the objective lens 14 side. Because of this, the number of photodetectors and the number of wires can be reduced.

The beam splitter 16 is a polarized light separation film that totally transmits linearly polarized light in one direction and totally reflects linear polarized light in a direction orthogonal thereto with respect to the red light beam 62 with a wavelength $\lambda 2$. The beam splitter 16 totally transmits the blue light beam 61 with a wavelength $\lambda 1$. Thus, the beam splitter 16 also is an optical path branching element having wavelength selectivity together with polarization characteristics, in the same way as in the beam splitter 4.

Figure 2:
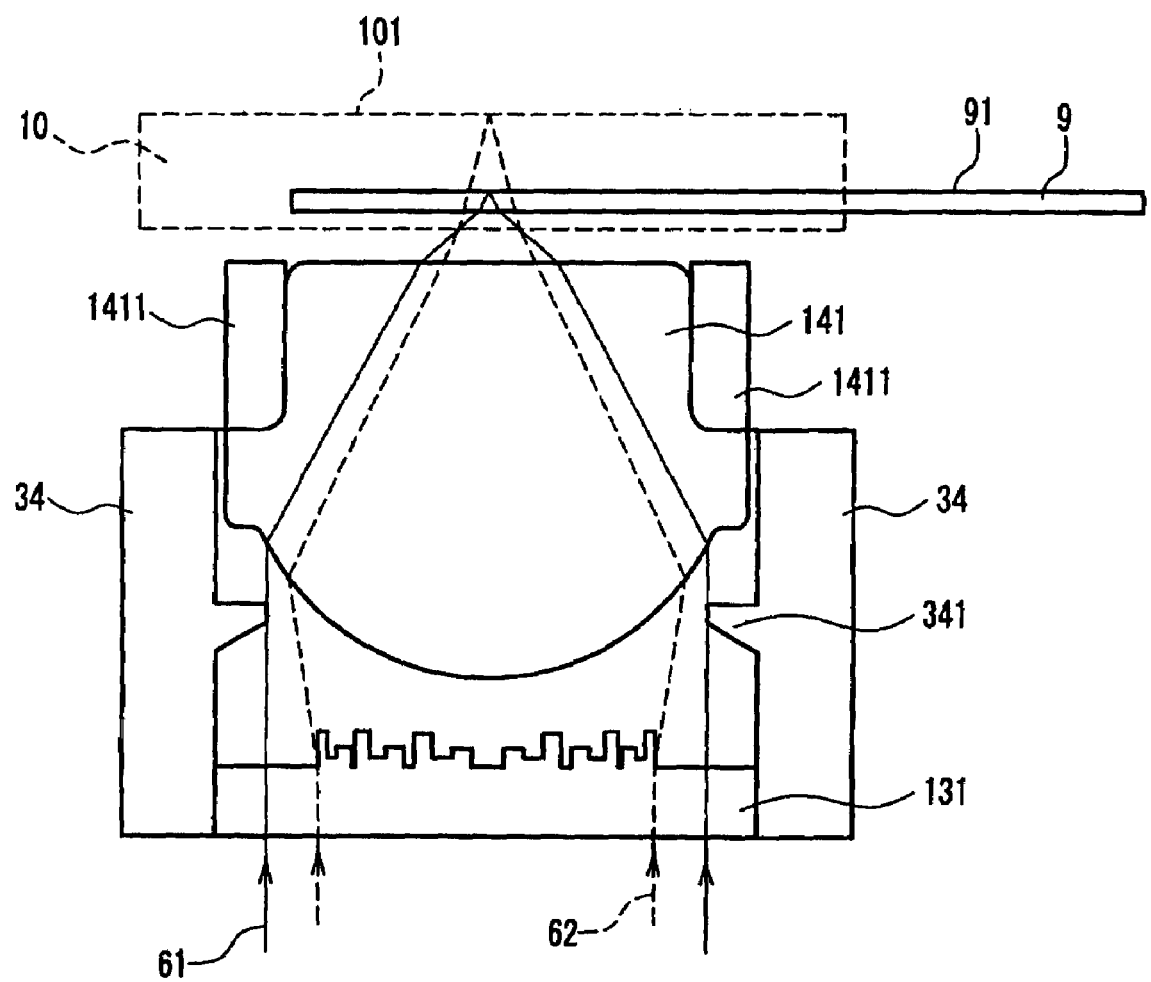
FIG. 2 is a cross-sectional view showing a specific example of a complex objective lens composed of a hologram 13 and an objective lens 14 in FIG. 1.

FIG. 2 is a cross-sectional view showing a specific example of a complex objective lens composed of the hologram 13 and the objective lens 14 in FIG. 1. In FIG. 2, reference numeral 131 denotes a hologram as a diffraction type optical element. The hologram 131 transmits a large light amount of the blue light beam 61 with a wavelength $\lambda 1$ without diffracting it, and diffracts the red light beam 62 with a wavelength $\lambda 2$, as described later. Light that has not been diffracted when passing through a diffraction element is called 0th-order diffracted light, so that such light will be represented as 0th-order diffracted light.

The hologram 131 transmits the blue light beam 61 with a wavelength $\lambda 1$ as 0th-order diffracted light, so that the hologram 131 does not convert a wavefront with respect to the blue light beam 61. Thus, the objective lens 141 is designed so that the substantially parallel blue light beam 61 with a wavelength $\lambda 1$ is condensed onto the information recording surface 91 through a base with a thickness t1 of the first optical disk 9. Since the hologram 131 does not convert a wavefront with respect to the blue light beam 61, it is not required to set the relative position of the hologram 131 and the objective lens 141 with high precision in terms of recording/reproducing of information with respect to the first optical disk 9. In the case where the permissible position error of the objective lens 141 and the hologram 131 can be increased with respect to the blue light beam 61 with a wavelength $\lambda 1$ for recording/reproducing information with respect to the first optical disk 9 with the shortest wavelength and the highest recording density, and as described later, information is recorded/reproduced with respect to an optical disk having a lower recording density with a light beam having a longer wavelength, the relative position of the hologram 131 and the objective lens 141 may be considered. Thus, an optical head excellent in productivity can be configured, in which the permissible margin of error of the relative position can be increased more.

Next, the function of the hologram 131 when information is recorded/reproduced with respect to the optical disk 10 using the red light beam 62 will be described in detail. The hologram 131 transmits the blue light beam 61 with a wavelength $\lambda 1$ as 0th-order light, and diffracts the red light beam 62 with a wavelength $\lambda 2$. The objective lens 141 condenses the red light beam 62 onto the information recording surface 101 through a base with a thickness of about 0.6 mm of the second optical disk 10. Herein, in the second optical disk 10, the base thickness is large (i.e., 0.6 mm) from the light incident surface to the information recording surface 101. Therefore, it is required to set a focal point position farther away from the objective lens 141, compared with the focal point position in the case where information is recorded/reproduced with respect to the first optical disk 9 with a base thickness of 0.1 mm. As shown in FIG. 2, the red light beam 62 is converted to dispersed light by wavefront conversion, whereby the focal point position is corrected and spherical aberration caused by the difference in base thickness is corrected.

The red light beam 62 with a wavelength $\lambda 2$ is subjected to wavefront conversion by the hologram 131. Thus, when there is an error in the relative position of the hologram 131 and the objective lens 141, the wavefront as designed is not incident upon the objective lens 141, and aberration occurs on the wavefront incident upon the second optical disk 10, resulting in degraded condensing characteristics. Desirably, the hologram 131 and the objective lens 141 are integrally fixed by a support 34, or the hologram 131 is formed directly on the surface of the objective lens 141, whereby they are moved integrally by a common driving unit 15 (FIG. 1) for focal point control and tracking control.

Figure 3A:
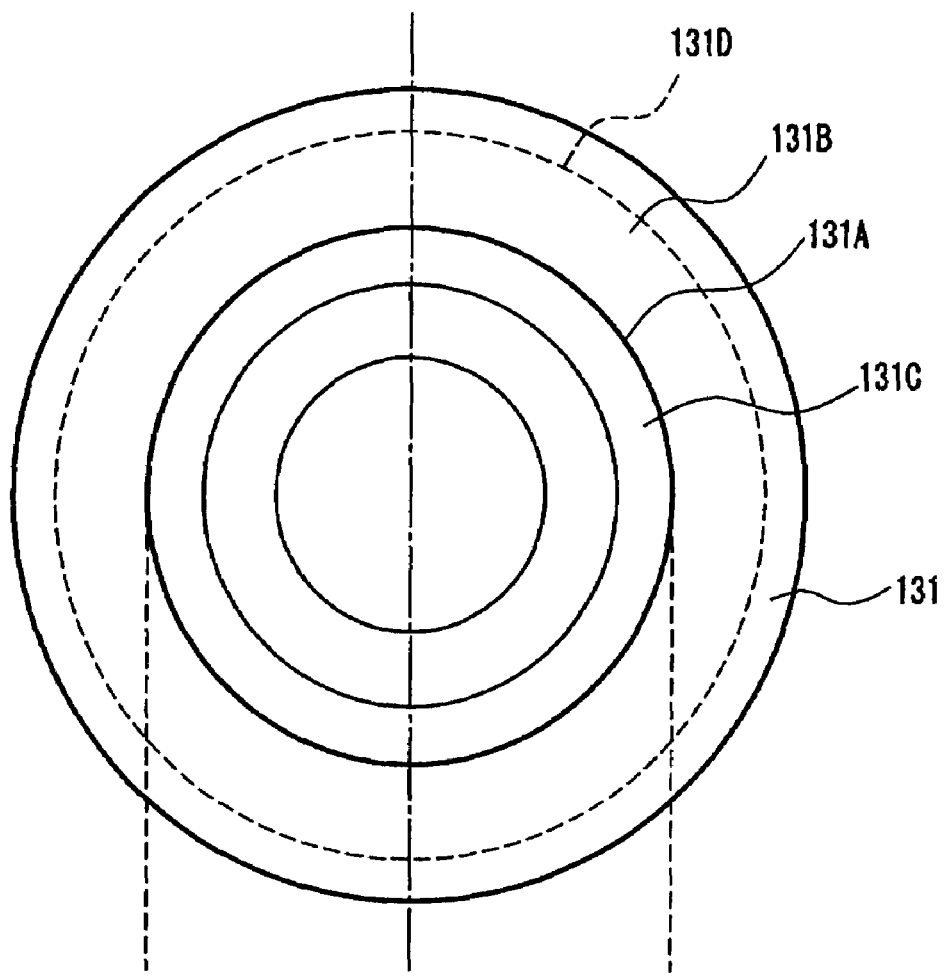
FIG. 3A is a plan view showing a configuration of the hologram 131 in FIG. 2.
Figure 3B:
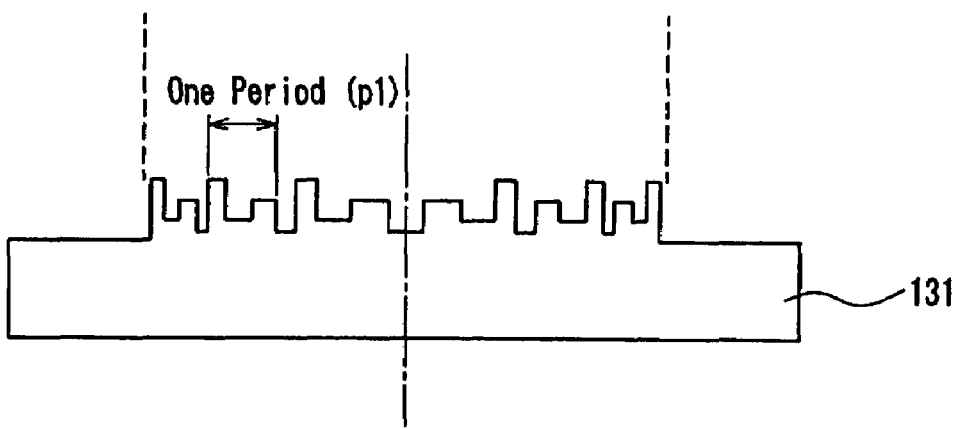
FIG. 3B is a cross-sectional view showing a configuration of the hologram 131 in FIG. 2.

FIG. 3A is a plan view showing a configuration of the hologram 131, and FIG. 3B is a cross-sectional view similar to FIG. 2, showing a configuration of the hologram 131. The hologram 131 has different configurations between an inner side (inner circumferential portion 131C) and an outer side (outer peripheral portion 131B between an inner/outer peripheral boundary 131A and an effective range 131D) of the inner/outer peripheral boundary 131A. The inner circumferential portion 131C is a region including a crossing point (i.e., the center) between the hologram 131 and the optical axis. This region also is used for recording/reproducing information with respect to the second optical disk 10 using the red light beam 62 and for recording/reproducing information with respect to the first optical disk 9 using the blue light beam 61.

Thus, a concentric diffraction grating is formed in the inner circumferential portion 131C. Regarding the outer peripheral portion 131B, it is required that a numerical aperture NAb when information is recorded/reproduced with respect to the first optical disk 9 with the blue light beam 61 is larger than a numerical aperture NAr when information is recorded/reproduced with respect to the second optical disk 10 with the red light beam 62 (NAb>NAr). Therefore, it is required to provide the outer peripheral portion 131B, which condenses only the blue light beam 61 onto the first optical disk 9 and allows the red light beam 62 to have aberration with respect to the second optical disk 10, around the inner circumferential portion 131C that condenses the blue light beam 61 and the red light beam 62 onto the respectively corresponding first optical disk 9 and second optical disk 10.

In the present embodiment, a hologram is not formed in the outer peripheral portion 131B. The objective lens 141 is designed so that the blue light beam 61 passing through the outer peripheral portion 131B is condensed onto the first optical disk 9 after passing through a base of about 0.1 mm, whereby the red light beam 62 passing through the outer peripheral portion 131B is not condensed onto the second optical disk 10, and the condition of NAb>NAr can be realized.

Figure 4A:
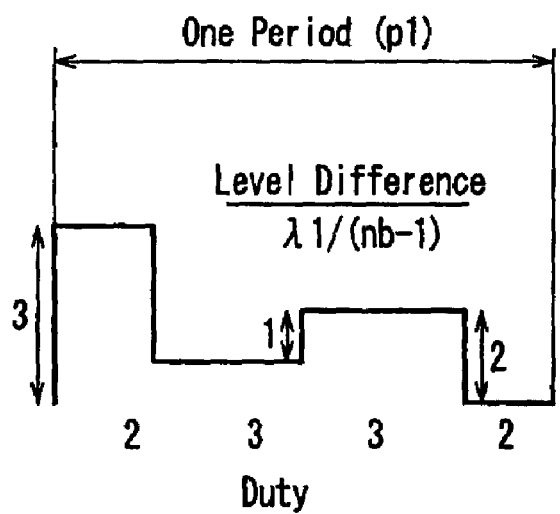
FIG. 4A is a cross-sectional view showing a stepped shape in one period (p1) of a grating formed in an inner circumferential portion 131C of the hologram 131 shown in FIG. 3A.
Figure 4B:
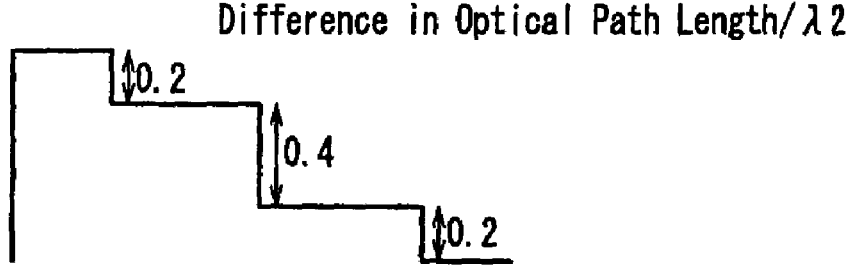
FIG. 4B shows a phase modulation amount with respect to a red light beam 62 (wavelength $\lambda 2$) corresponding to FIG. 4A.

FIG. 4A is a cross-sectional view showing a physical level difference in one period (p1) of a grating formed in the inner circumferential portion 131C of the hologram 131 shown in FIG. 3A, and FIG. 4B shows a phase modulation amount with respect to the red light beam 62 (wavelength λ2) corresponding to FIG. 4A. Herein, the hologram 131 according to the present embodiment has a lens action, and a grating pitch is varied locally. The grating pitch is illustrated merely using any points on the hologram 131 as representative. This also applies to the other embodiments. In FIGS. 4A and 4B, a lower side represents a hologram base side (side with a higher refractive index) and an upper side represents an air side (side with a lower refractive index). Hereinafter, the same definition will be used in similar figures.

In FIG. 4A, a vertical direction represents a level difference. Herein, a shape obtained by combining rectangular shapes will be referred to as a stepped shape. A "nb" represents a refractive index of a hologram material with respect to the blue light beam 61 (wavelength λ1). Assuming that the hologram material is, for example, BK7, "nb" is 1.5302. Herein, BK7 will be illustrated as an example. Other glass materials, polycarbonate, and polycycloolefin type resin materials also can be used. This also applies to the other embodiments.

It is assumed that one unit of the level difference corresponds to an amount at which a difference in optical path length is about one wavelength (i.e., phase difference is about 2π) with respect to the blue light beam 61. Then, the unit level difference d1 is λ1/(nb−1)=0.764 μm.

When the level difference of a grating is set to be an integral multiple of the unit level difference d1 to obtain a stepped cross-sectional shape, the phase modulation amount with respect to the blue light beam 61 in this shape becomes an integral multiple of 2π, which substantially corresponds to the absence of phase modulation.

On the other hand, assuming that the refractive index of a hologram material with respect to the red light beam 62 is "nr", in the case where the hologram material is BK7, "nr" is 1.5142. Therefore, the difference in optical path length occurring in the red light beam 62 due to the unit level difference d1 is d1×(nr−1)/λ2=0.595, i.e., about 0.6 times the wavelength λ2.

Assuming a stepped shape in which the level difference is set to be 0 time, twice, once, and three times d1 from the right as shown in FIG. 4A, as described above, phase modulation does not occur principally and diffraction does not occur in the blue light beam 61, i.e., 0th-order diffracted light becomes strongest. Then, the difference in optical path length is changed in a stepped shape in the order of: 0 time, 1.2 times, 0.6 times, and 1.8 times the wavelength λ2 with respect to the red light beam 62. Among them, the integral multiple corresponds to the absence of phase modulation. Therefore, substantially, the difference in optical path length is changed in a stepped shape in the order of: 0 time, 0.2 times, 0.6 times, and 0.8 times the wavelength λ2, as shown in FIG. 4B. The width of each step in one period is changed with respect to such a stepped shape change, and a diffraction efficiency is calculated. As a result, as shown in FIG. 4A, assuming that the ratio of step widths is about 2:3:3:2, the diffraction efficiency of +1st-order diffracted light of the red light beam 62 becomes highest, and about 75% diffraction efficiency is obtained according to the Scalar calculation.

The ratio of step widths herein is the ratio of physical lengths when a peripheral grating pitch is constant. However, when a peripheral grating pitch is changed rapidly, it is desirable to change the ratio of step widths in accordance with the rapid change. This point also applies to the embodiments described later. The stepped configuration that does not allow phase modulation to occur with respect to the blue light beam 61 and diffracts the red light beam 62 also is disclosed in JP 10(1998)-334504 A and Session We-C-05 of ISOM2001 (page 30 of the preprints) listed as the second conventional example. However, these documents do not show that the level difference is formed in a stepped shape in the order of 0 time, twice, once, and three times the unit level difference d1, and the ratio of step widths is set to be about 2:3:3:2, as in the present embodiment.

In the configuration of the present example, the step difference is set to be at most three times the unit step difference d1, i.e. the step difference is minimized as a 4-stepped shape. Thus, the production errors and the loss of a light amount due to wall surfaces of the steps (rising surfaces in the vertical direction in the figure) are minimized. In addition, an optimum ratio of step widths is found.

Thus, the light amount of +1st-diffracted light of the red light beam 62 can be increased, which is particularly advantageous for ensuring a recording light amount. However, such an effect cannot be obtained in the prior art.

Furthermore, with respect to the overall configuration of an optical head, an example of an additionally effective configuration will be described below. The following configuration is effective for all the embodiments. The important point of the present embodiment lies in the hologram 13 (131 in the present embodiment) for realizing compatible reproducing/recording of information with respect to the first and second optical disks 9 and 10, and the objective lens 14 (141 in the present embodiment) used in combination with the hologram 13. In the other configurations described above and below, the beam splitter 16, the detection lens 32, and the detection hologram 31 are not required elements. These elements exhibit their effects as preferable configurations; however, the other configurations can be used appropriately.

In FIG. 1, by placing a 3-beam grating (diffraction element) 3 between the blue laser light source 1 and the beam splitter 4, a tracking error signal of the first optical disk 9 can be detected by a well-known differential push-pull (DPP) method.

Furthermore, in the case where two directions vertical to an optical axis are defined as an x-direction and a y-direction, by placing a beam shaping element 2 that enlarges, for example, only an x-direction between the blue laser light source 1 and the beam splitter 4, a far-field pattern of the blue light beam 61 can be approximated to an intensity distribution close to a point-symmetrical system with respect to an optical axis, and a light use efficiency can be enhanced. The beam shaping element 2 can be configured by using a double-sided cylindrical lens.

By further placing the 3-beam grating (diffraction element) 22 between the red laser light source 20 and the beam splitter 16, a tracking error signal of the second optical disk 10 can be detected by a well-known differential push-pull (DPP) method.

Furthermore, it also is effective to change the parallel degree of a light beam by moving the collimator lens 8 in an optical axis direction (right-left direction in FIG. 1). If there is a thickness error of a base, and a base thickness ascribed to an interlayer thickness in the case where the first optical disk 9 is a two-layer disk, spherical aberration occurs. However, by moving the collimator lens 8 in an optical axis direction, spherical aberration can be corrected. Thus, the spherical aberration can be corrected by about several 100 m$\lambda$ when a numerical aperture NA of light condensed onto the first optical disk 9 is 0.85, by moving the collimator lens 8, whereby a base thickness of ±30 μm can be corrected.

However, when information is recorded/reproduced with respect to a DVD using the objective lens 14 corresponding to a base thickness of 0.1 mm, it is required to compensate for a difference in base thickness of 0.5 mm or more. In this case, the correction of spherical aberration only with the movement of the collimator lens 8 is insufficient, so that a wavefront needs to be converted by the hologram (131 for example). The following also is possible: in the case where information is recorded/reproduced with respect to the second optical disk 10 using the red light beam 62, the collimator lens 8 is moved to the left side of FIG. 1, i.e., the side close to the red laser light source 20. Because of this, the red light beam 62 directed to the objective lens 14 is converted to dispersed light, and a spot condensed onto the second optical disk 10 is placed away from the objective lens 14. In addition, a part of aberration caused by a base thickness is corrected to reduce an aberration correction amount required for the hologram 13. Accordingly, a hologram pitch is enlarged to facilitate the production of the hologram 13.

Furthermore, the beam splitter 4 is configured so as to transmit a part (e.g., about 10%) of linearly polarized light emitted from the blue laser light source 1, and the transmitted light beam is guided to a photodetector 7 by a condensing lens 6. Accordingly, a change in the amount of light emitted from the blue laser light source 1 is monitored by using a signal obtained from the photodetector 7, and the change in light amount is fed back, whereby the amount of light emitted from the blue laser light source 1 can be controlled to be constant.

Furthermore, the beam splitter 4 is configured so as to reflect a part (e.g., about 10%) of linearly polarized light emitted from the red laser light source 20, and the reflected light beam is guided to the photodetector 7 by the condensing lens 6. Accordingly, a change in the amount of light emitted from the red laser light source 20 is monitored by using a signal obtained from the photodetector 7, and the change in light amount is fed back, whereby the amount of light emitted from the red laser light source 20 can be controlled to be constant.

Furthermore, as shown in FIG. 2, in order to set a numerical aperture (NA), when the blue light beam 61 is condensed onto the first optical disk 9, to be a desired value (about 0.85), it is effective to provide an opening limitation member 341. Particularly, in the case where the objective lens 141 and the hologram 131 are fixed integrally using the support 34, and they are moved by the driving unit 15 (FIG. 1), if the shape of the support 34 is formed, for example, as shown in FIG. 2, so that the opening limitation member 341 is formed integrally, the number of parts can be reduced.

Furthermore, in FIG. 2, by cutting a portion of the objective lens 14 (141 for example), which is on a side close to the second optical disk 10 and through which the blue light beam 61 does not pass due to the distance from an optical axis (forming a cut-away portion 1411), or by forming the objective lens 14 so as not to include a member in part, when information is recorded/reproduced with respect to an optical disk in a cartridge, the objective lens 14 can be prevented from coming into contact with the cartridge.

Embodiment 2

Next, Embodiment 2 of the present invention will be described. The overall configuration of an optical head according to the present embodiment is the same as that shown in FIG. 1 referred to in the description of Embodiment 1. In the present embodiment, the configuration of the hologram 13 and the objective lens 14 shown in FIG. 1 is different from that of Embodiment 1.

Figure 5:
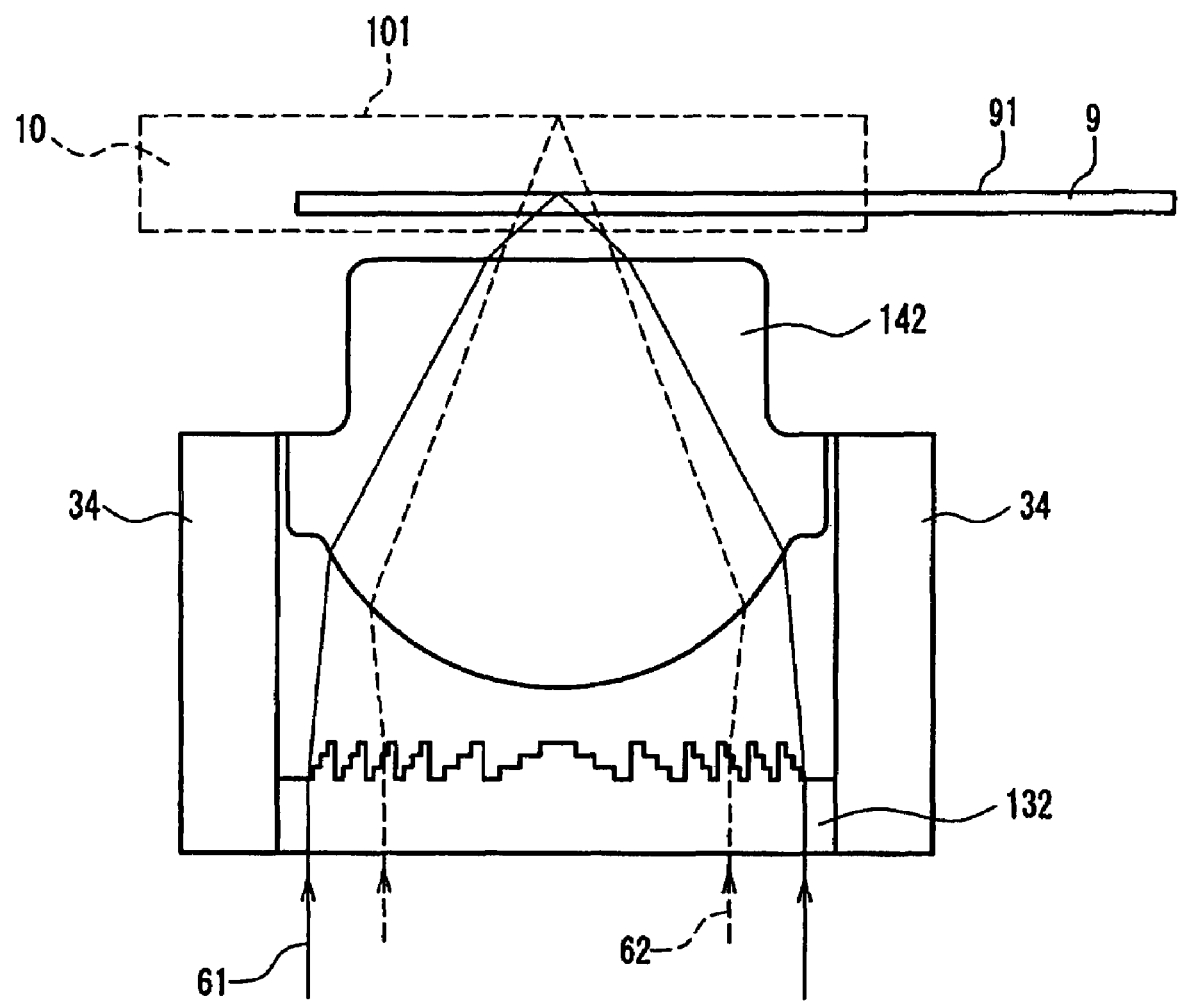
FIG. 5 is a cross-sectional view showing a specific example of a complex objective lens composed of the hologram 13 and the objective lens 14 shown in FIG. 1 in Embodiment 2 of the present invention.

FIG. 5 is a cross-sectional view showing a specific example of a complex objective lens composed of the hologram 13 and the objective lens 14 shown in FIG. 1. In FIG. 5, reference numeral 132 denotes a hologram. The hologram 132 diffracts the blue light beam 61 with a wavelength $\lambda 1$ to effect a convex lens action, and diffracts the red light beam 62 with a wavelength $\lambda 2$ to effect a concave lens action, as described later. Herein, the diffraction of the lowest order that effects a convex lens action is defined as +1st-order diffraction. Then, the red light beam 62 is subjected to a concave lens action by −1st-order diffraction that is conjugate to +1st-order diffracted light, i.e., that has a diffraction direction at each point on the hologram 132 opposite to that of +1st-order diffracted light.

An objective lens 142 is designed in such a manner that after the blue light beam 61 with a wavelength λ1 is diffracted by the hologram 132 and subjected to a convex lens action, the objective lens 142 converges the blue light beam 61 so as to condense it onto an information recording surface 91 through a base of the first optical disk 9 with a thickness of about 0.1 mm.

Next, the function of the hologram 132 when information is recorded/reproduced with respect to the second optical disk 10 using the red light beam 62 will be described. The hologram 132 diffracts the red light beam 62 with a wavelength λ2 as −1st-order diffracted light to effect a concave lens action. The objective lens 142 condenses the red light beam 62 onto the information recording surface 101 through a base of the second optical disk 10 with a thickness of about 0.6 mm. Herein, in the second optical disk 10, the base thickness is large (i.e., 0.6 mm) from the light incident surface to the information recording surface 101. Therefore, it is required to set a focal point position farther away from the objective lens 142, compared with the focal point position in the case where information is recorded/reproduced with respect to the first optical disk 9 with a base thickness of 0.1 mm. As shown in FIG. 5, the blue light beam 61 is converted to converged light and the red light beam 62 is converted to dispersed light by wavefront conversion, whereby the focal point position is corrected and spherical aberration caused by the difference in base thickness is corrected.

The blue light beam 61 with a wavelength λ1 and the red light beam 62 with a wavelength λ2 are subjected to wavefront conversion by the hologram 132. Thus, when there is an error in the relative position of the hologram 132 and the objective lens 142, the wavefront as designed is not incident upon the objective lens 142, and aberration occurs on the wavefront incident upon the first optical disk 9 and the second optical disk 10, resulting in degraded condensing characteristics. Desirably, the hologram 132 and the objective lens 142 are integrally fixed, whereby they are moved integrally by the common driving unit 15 (FIG. 1) for focal point control and tracking control.

Figure 6A:
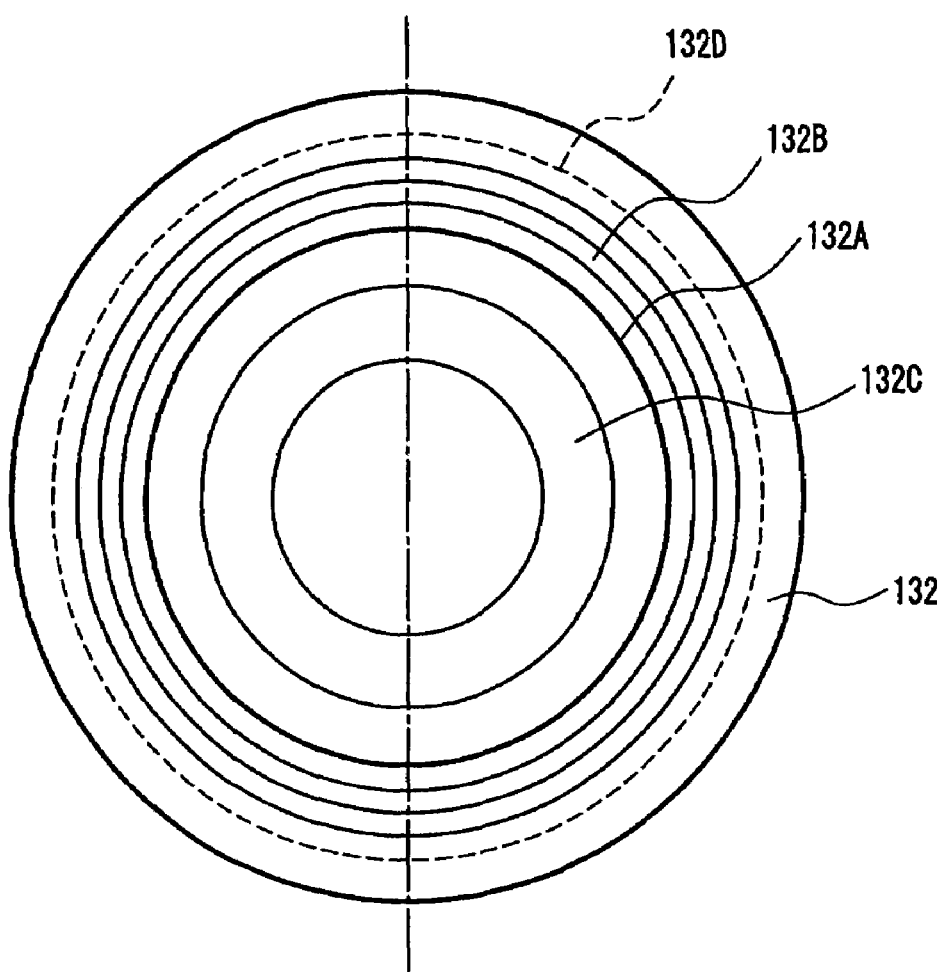
FIG. 6A is a plan view showing a configuration of the hologram 132 in FIG. 5.
Figure 6B:
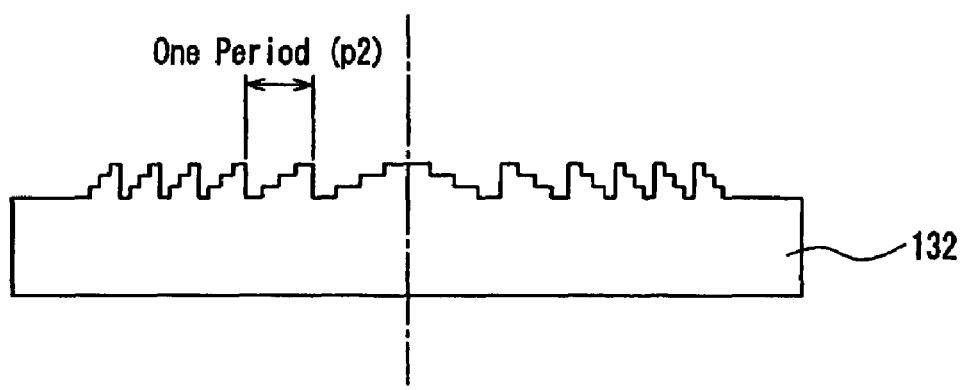
FIG. 6B is a cross-sectional view showing a configuration of the hologram 132 in FIG. 5.

FIG. 6A is a plan view showing a configuration of the hologram 132, and FIG. 6B is a cross-sectional view similar to FIG. 5, showing a configuration of the hologram 132. The hologram 132 has different configurations between an inner side (inner circumferential portion 132C) and an outer side (outer peripheral portion 132B between an inner/outer peripheral boundary 132A and an effective range 132D) of the inner/outer peripheral boundary 132A. The inner circumferential portion 132C is a region including a crossing point (i.e., the center) between the hologram 132 and the optical axis. This region also is used for recording/reproducing information with respect to the second optical disk 10 using the red light beam 62 and for recording/reproducing information with respect to the first optical disk 9 using the blue light beam 61. Thus, a diffraction grating in the inner circumferential portion 132C and a portion of the objective lens 142 through which the red light beam 62 diffracted from the diffraction grating passes are designed so that +1st-order diffracted light of the blue light beam 61 is condensed onto the first optical disk 9, and −1st-order diffracted light of the red light beam 62 is condensed onto the second optical disk 10.

Regarding the outer peripheral portion 132B, it is required that a numerical aperture NAb when information is recorded/reproduced with respect to the first optical disk 9 with the blue light beam 61 is larger than a numerical aperture NAr when information is recorded/reproduced with respect to the second optical disk 10 with the red light beam 62 (NAb>NAr). Therefore, it is required to provide the outer peripheral portion 132B and an outer peripheral portion of the objective lens 142 corresponding thereto, so as to condense only +1st-order diffracted light of the blue light beam 61 onto the first optical disk 9 and allow −1st-order diffracted light of the red light beam 62 to have aberration with respect to the second optical disk 10, around the inner circumferential portion that condenses the blue light beam 61 and the red light beam 62 onto the respectively corresponding first optical disk 9 and second optical disk 10. More specifically, although not shown, it is desirable to design the objective lens 142 differently between the inner and outer peripheries, in the same way as in the hologram 132. Because of this, an optimum NA, i.e., the condition of NAb>NAr can be realized.

Figure 7A:
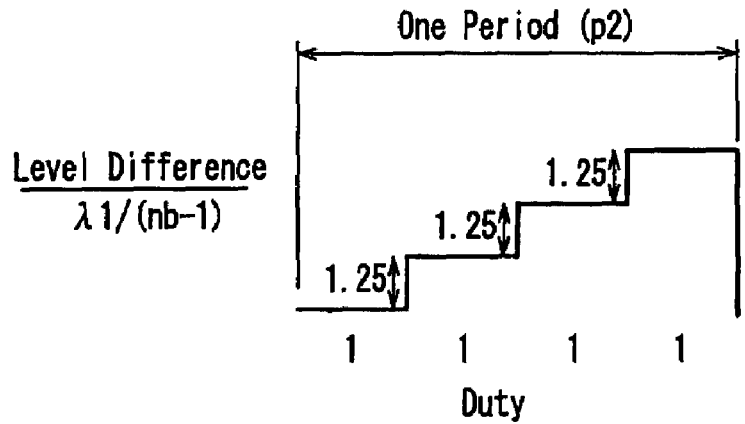
FIG. 7A is a cross-sectional view showing a stepped shape in one period (p2) of a grating formed in the hologram 132.
Figure 7B:
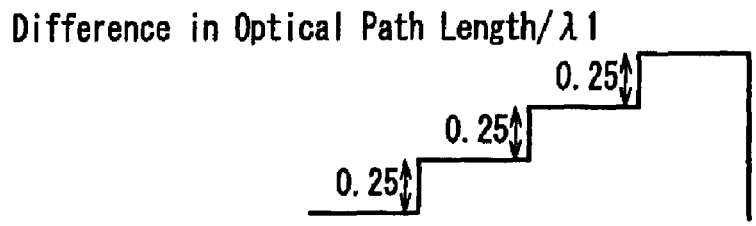
FIG. 7B shows a phase modulation amount with respect to a blue light beam 61 (wavelength $\lambda 1$) corresponding to FIG. 7A.
Figure 7C:
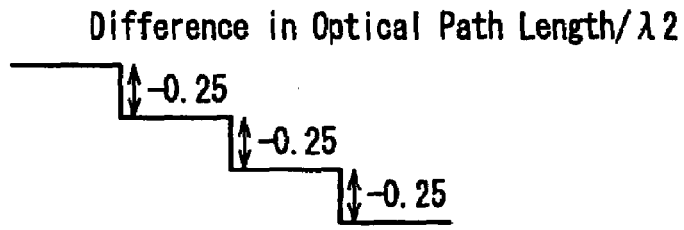
FIG. 7C shows a phase modulation amount with respect to a red light; beam 62 (wavelength $\lambda 2$) corresponding to FIG. 7A.

FIG. 7A is a cross-sectional view showing a physical level difference in one period (p2) of a grating formed in the hologram 132. FIG. 7B shows a phase modulation amount with respect to the blue light beam 61 (wavelength λ1) corresponding to FIG. 7A. FIG. 7C shows a phase modulation amount with respect to the red light beam 62 (wavelength λ2) corresponding to FIG. 7A.

In FIG. 7A, a vertical direction represents a level difference. A "nb" represents a refractive index of a hologram material with respect to the blue light beam 61. Assuming that the hologram material is, for example, BK7, "nb" is 1.5302. It is assumed that one unit of the level difference corresponds to an amount at which a difference in optical path length is about 1.25 wavelengths (i.e., phase difference is about 2π+π/2) with respect to the blue light beam. Then, the unit level difference d2 is 1.25×λ1/(nb−1)=0.955 μm.

When the level difference of a grating is set to be an integral multiple of the unit level difference d2 to obtain a stepped cross-sectional shape in which the ratio of four step widths is 1:1:1:1, the phase modulation amount with respect to the blue light beam 61 in this shape becomes an integral multiple of 2π+π/2, which substantially corresponds to the phase modulation amount of π/2 per step.

On the other hand, assuming that the refractive index of a hologram material with respect to the red light beam 62 is "nr", in the case where the hologram material is BK7, "nr" is 1.5142. Therefore, the difference in optical path length occurring in the red light beam 62 due to the unit level difference d2 is d2×(nr−1)/λ2=0.744, i.e., about ¾ times the wavelength λ2, and the phase modulation amount becomes about −π/2 per step.

A stepped cross-sectional shape of 4 steps is assumed in which the level difference of a grating is an integral multiple of the unit level difference d2, as shown in FIG. 7A. When a level difference is continued to be overlaid, as shown in FIG. 7B, the phase modulation amount is changed by π/2 per step, i.e., the difference in optical path length is changed by +0.25 times λ1 with respect to the blue light beam 61. When the physical shape of the level difference is formed as shown in FIG. 7A, in the blue light beam 61, the diffraction efficiency of +1st-order diffracted light being subjected to a convex lens action is calculated to be about 80% (Scalar calculation), which is strongest among the diffraction orders.

When a level difference is continued to be overlaid, as shown in FIG. 7C, the phase modulation amount is changed by −π/2 per step, i.e., the difference in optical path length is changed by −0.25 times λ2 with respect to the red light beam 62. When the physical shape of the level difference is formed as shown in FIG. 7A, in the red light beam 62, the diffraction efficiency of −1st-order diffracted light being subjected to a concave lens action is calculated to be about 80% (Scalar calculation), which is strongest among the diffraction orders.

As described in the present embodiment, because of the hologram configuration having a stepped cross-sectional shape that causes the difference in optical path length that is 1.25 times the wavelength per step, the compatible recording and reproducing of information with respect to different kinds of disks can be realized, which use +1st-order diffracted light and −1st-order diffracted light respectively having a diffraction efficiency of 50% or more. None of the above-mentioned conventional examples disclose such compatible recording and reproducing.

In the present embodiment, because of the above-mentioned novel configuration, the diffraction order of the blue light beam 61 and the red light beam 62 become +1st-order diffracted light and −1st-order diffracted light, respectively, and the difference in order becomes 2. Therefore, a minimum pitch of a hologram required for exhibiting the same aberration correction effect and the movement effect of a focal point position can be made larger than that of Embodiment 1, and a hologram can be produced easily. Furthermore, the amount of diffracted light as calculated can be obtained easily.

Furthermore, the hologram 132 has a convex lens action with respect to the blue light beam 61. The chromatic dispersion by the diffraction action is in an opposite direction to that of the refraction action. Therefore, when the hologram 132 is combined with the objective lens 142 that is a refraction type convex lens, chromatic aberration with respect to a wavelength change within several nm, in particular, wavelength dependency of a focal length can be cancelled.

Furthermore, the overall configuration of the optical head can be combined with the configuration additionally described in Embodiment 1.

Embodiment 3

Next, Embodiment 3 of the present invention will be described. The overall configuration of an optical head according to the present embodiment is the same as that shown in FIG. 1 referred to in the description of Embodiment 1. In the present embodiment, the configuration of the hologram 13 shown in FIG. 1 is different from those of Embodiments 1 and 2.

Figure 8A:
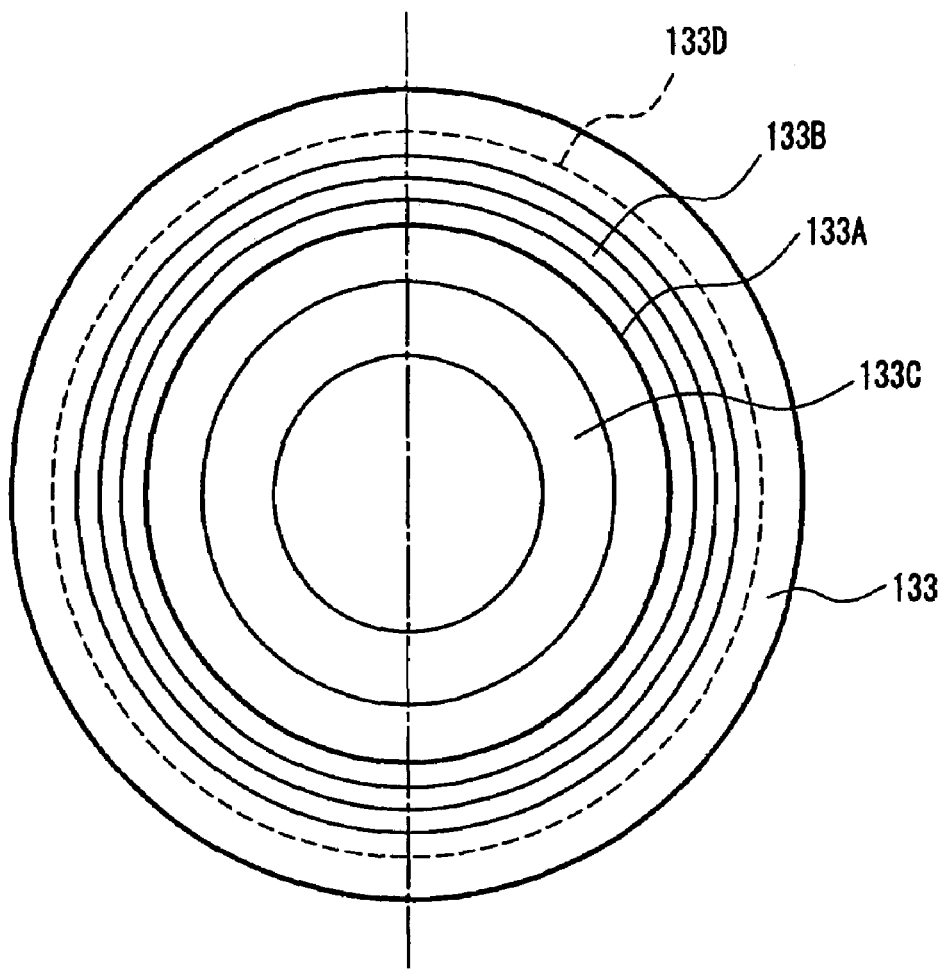
FIG. 8A is a plan view showing a specific example of the hologram 13 shown in FIG. 1 in Embodiment 3 of the present invention.
Figure 8B:
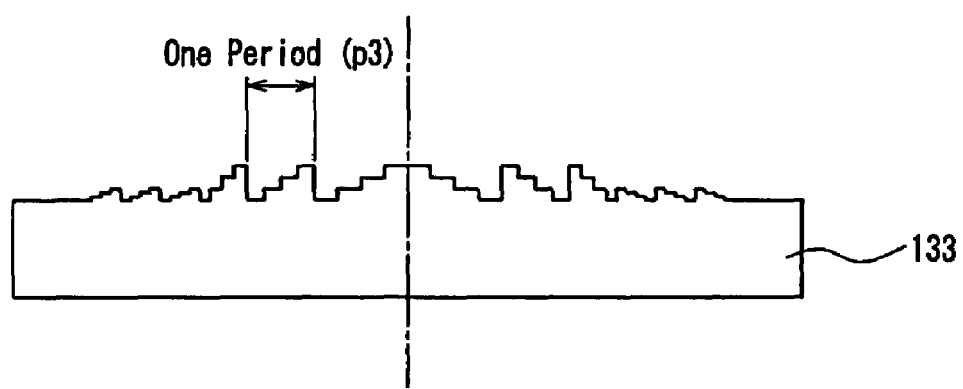
FIG. 8B is a cross-sectional view showing a specific example of the hologram 13 shown in FIG. 1 in Embodiment 3 according to the present invention.

FIGS. 8A and 8B are a plan view and a cross-sectional view showing a specific example of the hologram 13 shown in FIG. 1, respectively. In FIGS. 8A and 8B, reference numeral 133 denotes a hologram. An inner circumferential portion 133C of the hologram 133 is the same as the inner circumferential portion 132C of the hologram 132 illustrated and described in Embodiment 2. Furthermore, a grating pitch of an outer peripheral portion 133B also is the same as that of the outer peripheral portion 132B of the hologram 132 illustrated and described in Embodiment 2. However, as shown in FIG. 8B, the cross-sectional shape of a grating formed in the outer peripheral portion 133B is different from that in the outer peripheral portion 132B.

FIG. 9A is a cross-sectional view showing a physical level difference in one period (p3) of a grating formed in the outer peripheral portion 133B of the hologram 133. FIG. 9B shows a phase modulation amount with respect to the blue light beam 61 (wavelength λ1) corresponding to FIG. 9A. FIG. 9C shows a phase modulation amount with respect to the red light beam 62 (wavelength λ2) corresponding to FIG. 9A.

In FIG. 9A, a vertical direction represents a level difference. A "nb" represents a refractive index of a hologram material with respect to the blue light beam 61. Assuming that the hologram material is, for example, BK7, "nb" is 1.5302.

It is assumed that one unit of the level difference corresponds to an amount at which a difference in optical path length is about 0.25 wavelengths (i.e., phase difference is about π/2) with respect to the blue light beam. Then, the unit level difference d3 is 0.25×λ1/(nb−1)=0.191 μm.

On the other hand, assuming that the refractive index of a hologram material with respect to the red light beam 62 is "nr", in the case where the hologram material is BK7, "nr" is 1.5142. Therefore, the difference in optical path length occurring in the red light beam 62 due to the unit level difference d3 is d3×(nr−1)/λ2=0.149, i.e., about 0.15 times the wavelength λ2, and the phase modulation amount becomes about 0.3π per step.

The level difference of a grating is set to be an integral multiple of the unit level difference d3 to obtain a stepped cross-sectional shape in which the ratio of four step widths is about 1:1:1:1, as shown in FIG. 9A When a level difference is continued to be overlaid, as shown in FIG. 9B, the phase modulation amount is changed by π/2 per step, i.e., the difference in optical path length is changed by +0.25 times λ1 with respect to the blue light beam 61. When the physical shape of the level difference is formed as shown in FIG. 9A, in the blue light beam 61, the diffraction efficiency of +1st-order diffracted light being subjected to a convex lens action is calculated to be about 80% (Scalar calculation), which is strongest among the diffraction orders.

When a level difference is continued to be overlaid, as shown in FIG. 9C, the phase modulation amount is changed by −0.3π per step, i.e., the difference in optical path length is changed by 0.15 times λ2 with respect to the red light beam 62. When the physical shape of the level difference is formed as shown in FIG. 9A, in the red light beam 62, the diffraction efficiency of +1st-order diffracted light being subjected to a convex lens action is calculated to be about 50% (Scalar calculation), which is strongest among the diffraction orders. This is the same order as that of the blue light beam 61. Therefore, the red light beam 62 undergoes large aberration with respect to the second optical disk 10, and is not condensed thereon. Furthermore, in the red light beam 62, the diffraction efficiency of −1st-order diffracted light being subjected to a concave lens action is sufficiently weak (i.e., 10% or less). Thus, by decreasing the numerical aperture of the red light beam 62 with respect to the second optical disk 10, the condition (NAb>NAr) can be realized easily, under which the numerical aperture NAb when information is recorded/reproduced with respect to the first optical disk 9 with the blue light beam 61 is larger than the numerical aperture NAr when information is recorded/reproduced with respect to the second optical disk 10 with the red light beam 62.

As described above, in the present embodiment, a hologram has a configuration in which only the outer peripheral portion 133B has a stepped cross-sectional shape causing a difference in optical path that is 0.25 times the wavelength per step. The inner circumferential portion 133C uses conjugate light. None of the above-mentioned conventional examples disclose such compatible recording and reproducing of information with respect to different kinds of disks.

In the present embodiment, because of the above-mentioned novel configuration, in addition to the advantage described in Embodiment 2, the height of a grating in the outer peripheral portion 133B, in which a grating pitch of the hologram 133 is relatively narrow, can be lowered. Therefore, the hologram 133 can be produced easily. Furthermore, by decreasing the numerical aperture of the red light beam 62 with respect to the second optical disk 10, the condition (NAb>NAr) can be realized easily, under which the numerical aperture NAb when information is recorded/reproduced with respect to the first optical disk 9 with the blue light beam 61 is larger than the numerical aperture NAr when information is recorded/reproduced with respect to the second optical disk 10 with the red light beam 62.

Furthermore, the overall configuration of the optical head can be combined with the configuration additionally described in Embodiment 1.

Embodiment 4

Next, Embodiment 4 of the present invention will be described. The overall configuration of an optical head according to the present embodiment is the same as that shown in FIG. 1 referred to in the description of Embodiment 1. In the present embodiment, the configuration of the hologram 13 and the objective lens 14 shown in FIG. 1 is different from those of Embodiments 1 to 3.

Figure 10:
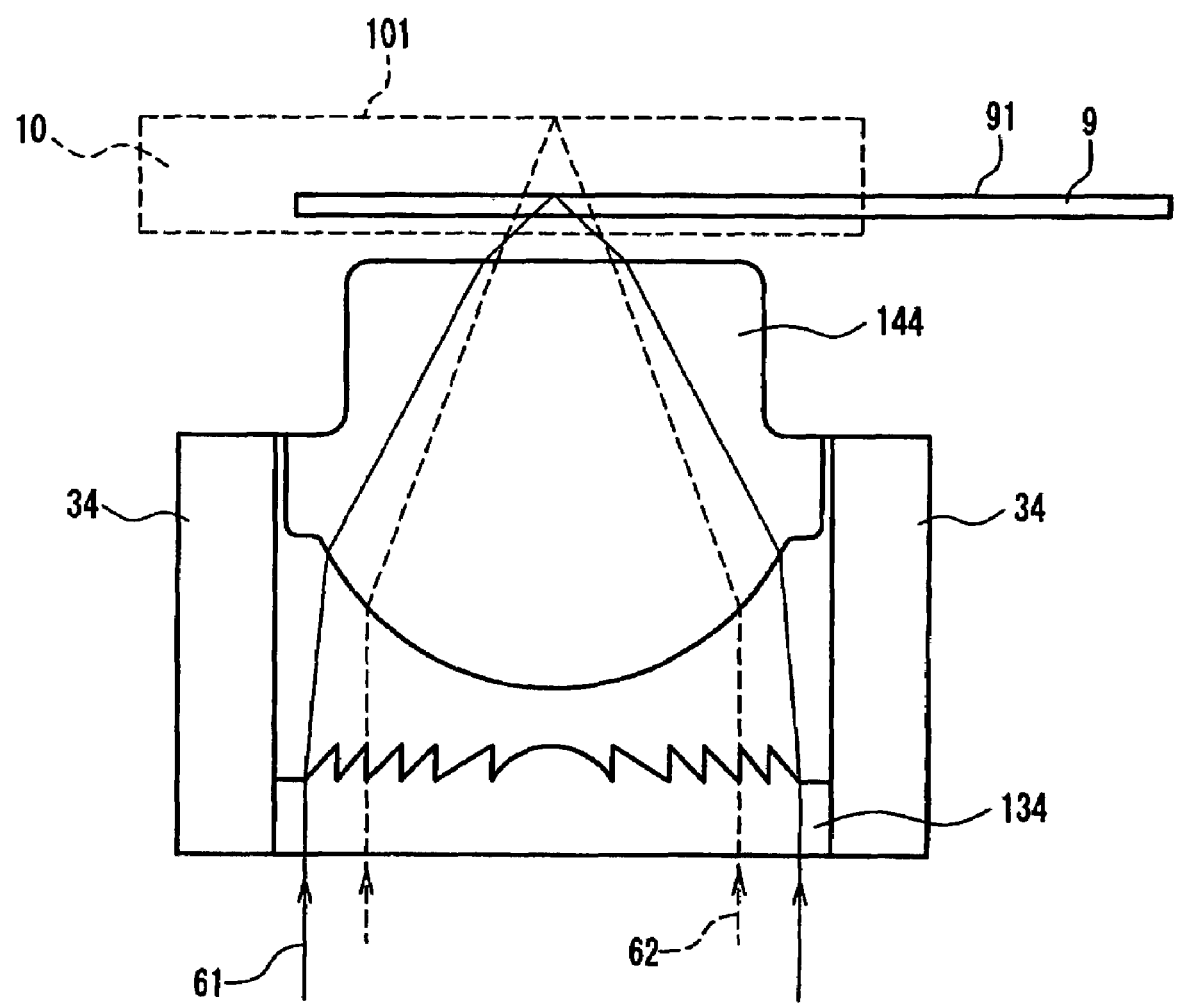
FIG. 10 is a cross-sectional view showing a specific example of a complex objective lens composed of the hologram 13 and the objective lens 14 shown in FIG. 1 in Embodiment 4 of the present invention.

FIG. 10 is a cross-sectional view showing a specific example of a complex objective lens composed of the hologram 13 and the objective lens 14 shown in FIG. 1. In FIG. 10, reference numeral 134 denotes a hologram. The hologram 134 diffracts the blue light beam 61 with a wavelength $\lambda 1$ to effect a convex lens action, and diffracts the red light beam 62 with a wavelength $\lambda 2$ to effect a convex lens action weaker than that with respect to the blue light beam 61, as described later. Herein, the lowest order diffraction that effects a convex lens action is defined as 1st-order diffraction. In the present embodiment, the hologram 134 is designed so that +2nd-order diffraction is effected most strongly with respect to the blue light beam 61. Because of this, +1st-order diffraction is effected most strongly with respect to the red light beam 62. Consequently, irrespective of whether the red light beam 62 has a wavelength longer than that of the blue light beam 61, a diffraction angle at each point on the hologram 134 becomes small. More specifically, the convex lens action of the hologram 134 when the hologram 134 diffracts the blue light beam 61 with a wavelength $\lambda 1$ becomes stronger than that with respect to the red light beam 62 with a wavelength $\lambda 2$. In other words, although the red light beam 62 is subjected to a convex lens action by the hologram 134, the red light beam 62 is relatively subjected to a concave lens action by diffraction, with reference to the action with respect to the blue light beam 61.

The objective lens 144 is designed as follows: after the hologram 134 subjects the blue light beam 61 with a wavelength $\lambda 1$ to +2nd-order diffraction to effect a convex lens action, the objective lens 144 further converges the blue light beam 61 to condense it onto the information recording surface 91 through a 0.1 mm thick base of the first optical disk 9.

Next, the function of the hologram 134 when information is recorded/reproduced with respect to the second optical disk 10 with the red light beam 62 will be described in detail. The hologram 134 subjects the red light beam 62 with a wavelength $\lambda 2$ to +1st-order diffraction to effect a convex lens action. The objective lens 144 condenses the red light beam 62 onto the information recording surface 101 through a 0.6 mm thick base of the second optical disk 10. Herein, in the second optical disk 10, the base thickness is large (i.e., 0.6 mm) from the light incident surface to the information recording surface 101. Therefore, it is required to set a focal point position farther away from the objective lens 144, compared with the focal point position in the case where information is recorded/reproduced with respect to the first optical disk 9 with a base thickness of 0.1 mm. As shown in FIG. 10, the blue light beam 61 is converted to converged light by wavefront conversion, and the conversion degree of the red light beam 62 is set to be lower than that of the blue light beam 61, whereby the focal point position is corrected and spherical aberration caused by the difference in base thickness is corrected.

The blue light beam 61 with a wavelength $\lambda 1$ and the red light beam 62 with a wavelength $\lambda 2$ are subjected to wavefront conversion by the hologram 134. Thus, when there is an error in the relative position of the hologram 134 and the objective lens 144, the wavefront as designed is not incident upon the objective lens 144, and aberration occurs on the wavefront incident upon the first optical disk 9 and the second optical disk 10, resulting in degraded condensing characteristics. Desirably, the hologram 134 and the objective lens 144 are integrally fixed, whereby they are moved integrally by the common driving unit 15 (FIG. 1) for focal point control and tracking control.

Figure 11A:
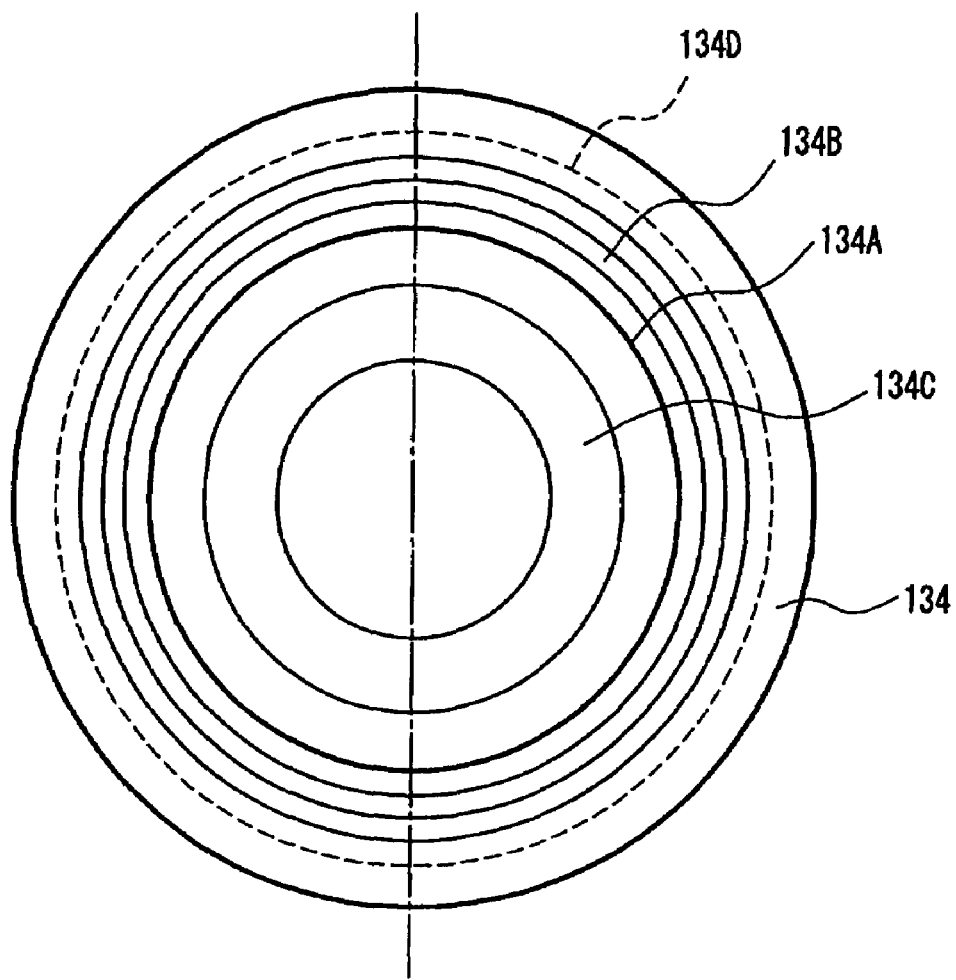
FIG. 11A is a plan view showing a configuration of a hologram 134 in FIG. 10.
Figure 11B:
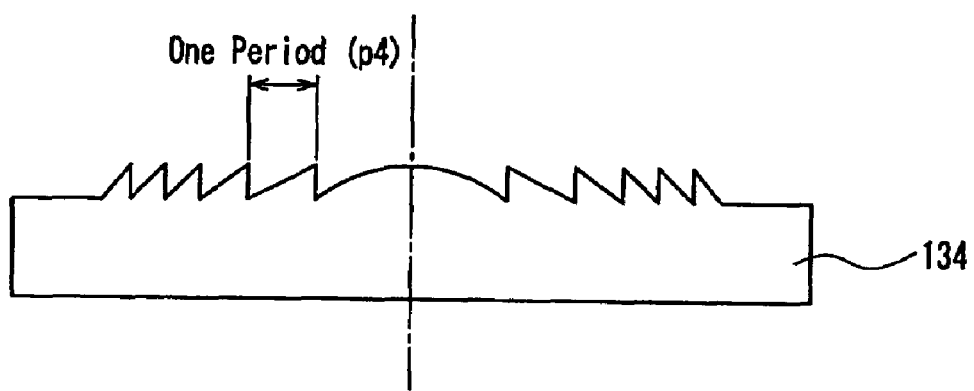
FIG. 11B is a cross-sectional view showing a configuration of the hologram 134 in FIG. 10.

FIG. 11A is a plan view showing a configuration of the hologram 134, and FIG. 11B is a cross-sectional view similar to FIG. 10, showing a configuration of the hologram 134. The hologram 134 has different configurations between an inner side (inner circumferential portion 134C) and an outer side (outer peripheral portion 134B between an inner/outer peripheral boundary 134A and an effective range 134D) of the inner/outer peripheral boundary 134A. The inner circumferential portion 134C is a region including a crossing point (i.e., the center) between the hologram 134 and the optical axis. This region also is used for recording/reproducing information with respect to the second optical disk 10 using the red light beam 62 and for recording/reproducing information with respect to the first optical disk 9 using the blue light beam 61. Thus, a diffraction grating in the inner circumferential portion 134C and a portion of the objective lens 144 through which the red light beam 62 diffracted from the diffraction grating passes are designed so that +2nd-order diffracted light of the blue light beam 61 is condensed onto the first optical disk 9, and +1st-order diffracted light of the red light beam 62 is condensed onto the second optical disk 10.

Regarding the outer peripheral portion 134B, it is required that a numerical aperture NAb when information is recorded/reproduced with respect to the first optical disk 9 with the blue light beam 61 is larger than a numerical aperture NAr when information is recorded/reproduced with respect to the second optical disk 10 with the red light beam 62 (NAb>NAr). Therefore, it is required to provide the outer peripheral portion 132B and an outer peripheral portion of the objective lens 144 corresponding thereto, so as to condense only +2nd-order diffracted light of the blue light beam 61 onto the first optical disk 9 and allow +1st-order diffracted light of the red light beam 62 to have aberration with respect to the second optical disk 10, around the inner circumferential portion that condenses the blue light beam 61 and the red light beam 62 onto the respectively corresponding first optical disk 9 and second optical disk 10. More specifically, although not shown, it is desirable to design the objective lens 144 differently between the inner and outer peripheries, in the same way as in the hologram 134. Because of this, an optimum NA, i.e., the condition of NAb>NAr can be realized.

Figure 12A:
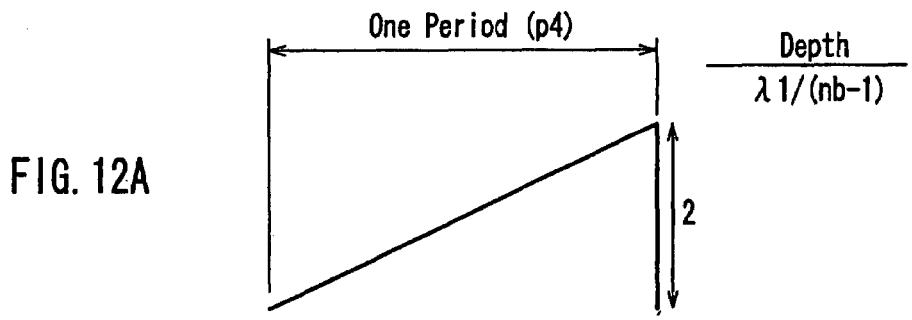
FIG. 12A is a cross-sectional view showing a sawtooth shape in one period (p4) of a grating formed in the hologram 134.
Figure 12B:
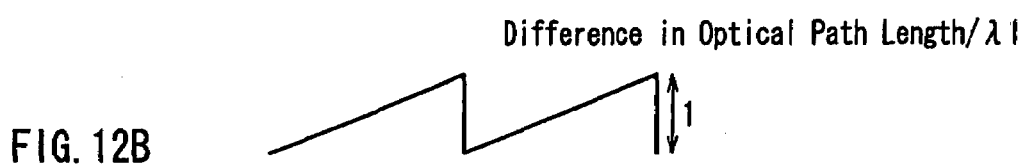
FIG. 12B shows a phase modulation amount with respect to the blue light beam 61 (wavelength λ1) corresponding to FIG. 12A.
Figure 12C:
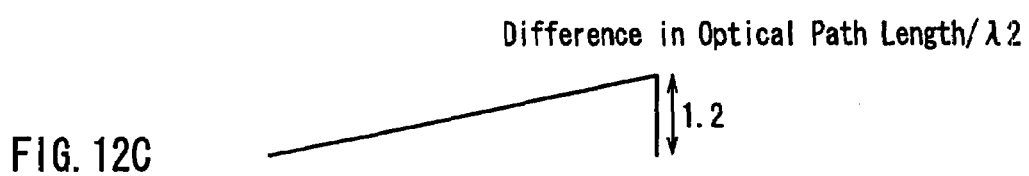
FIG. 12C shows a phase modulation amount with respect to the red light beam 62 (wavelength λ2) corresponding to FIG. 12A.

FIG. 12A is a cross-sectional view showing a physical shape in one period (p4) of a grating formed in the hologram 134. FIG. 12B shows a phase modulation amount with respect to the blue light beam 61 (wavelength λ1) corresponding to FIG. 12A. FIG. 12C shows a phase modulation amount with respect to the red light beam 62 (wavelength λ2) corresponding to FIG. 12A.

In FIG. 12A, the physical cross-sectional shape in one period (p4) of the grating has a sawtooth cross-sectional shape. Herein, in order to represent the direction of a slope in the sawtooth cross-sectional shape, the cross-sectional shape in FIG. 12A is expressed as a cross-sectional shape with a base having a slope on the left side. In accordance with this designation, the cross-sectional shape of the hologram 134 shown in FIG. 11B is expressed as a sawtooth cross-sectional shape (or simply a sawtooth shape) with a base having a slope on an outer peripheral side.

In FIG. 12A, the vertical direction represents the depth of a grating having a sawtooth cross-sectional shape. A "nb" represents a refractive index of a hologram material with respect to the blue light beam 61. Assuming that the hologram material is, for example, BK7, "nb" is 1.5302.

It is assumed that a depth "h1" of the sawtooth grating corresponds to an amount at which a difference in optical path length is about 2 wavelengths i.e., phase difference is about 4π) with respect to the blue light beam 61. Then, h1=2×λ1/(nb−1)=1.53 μm.

The phase modulation amount with respect to the blue light beam 61 in the above-mentioned shape is changed by 4π(=2×2π) in one period of the grating. Therefore, the intensity of +2nd-order diffracted light is maximized with respect to the blue light beam 61, and the diffraction efficiency based on the Scalar calculation becomes 100%.

On the other hand, assuming that the refractive index of a hologram material with respect to the red light beam 62 is "nr", in the case where the hologram material is BK7, "nr" is 1.5142. Therefore, the difference in optical path length occurring in the red light beam 62 due to the depth "h1" is h1×(nr−1)/λ2=1.19, i.e., about 1.2 times the wavelength λ2, and the phase modulation amount becomes about 2.4π. Thus, the intensity of +1st-order diffracted light becomes highest with respect to the red light beam 62, and the diffraction efficiency based on the Scalar calculation becomes about 80%.

It is assumed that the shape of a grating in one period is a sawtooth cross-sectional shape with a depth "h1", as shown in FIG. 12A. Since +2nd-order diffraction is strongest with respect to the blue light beam 61, as described above, the grating period determining a diffraction angle is substantially p4/2, and a phase change becomes as shown in FIG. 12B. With respect to the red light beam 62, +1st-order diffraction is strongest, so that the grating period determining a diffraction angle is substantially p4.

As described above, in the present embodiment, compatible recording and reproducing of information with respect to different kinds of disks is realized with +1st-order diffracted light of the red light beam 62, using a hologram having a sawtooth cross-sectional shape with a depth causing the difference in optical path length that is twice the wavelength λ1 and effects +2nd-order diffraction with respect to the blue light beam 61. None of the above-mentioned conventional examples disclose this concept.

In the present embodiment, because of the above-mentioned novel configuration, the hologram 134 has a convex lens action with respect to both the blue light beam 61 and the red light beam 62. The chromatic dispersion by the diffraction action is in an opposite direction to that of the refraction action. Therefore, when the hologram 134 is combined with the objective lens 144 that is a refraction type convex lens, chromatic aberration with respect to a wavelength change within several nm, in particular, wavelength dependency of a focal length can be cancelled.

Thus, according to the present embodiment, there is a remarkable effect that three objects: compatibility among different kinds of disks, correction of chromatic aberration, and correction of a focal point position can be achieved with only the hologram 134.

Embodiment 5

Next, Embodiment 5 of the present invention will be described. In the present embodiment, only a cross-sectional shape of a grating formed in the inner circumferential portion 134C of the hologram 134 of Embodiment 4 is changed.

Figure 13A:
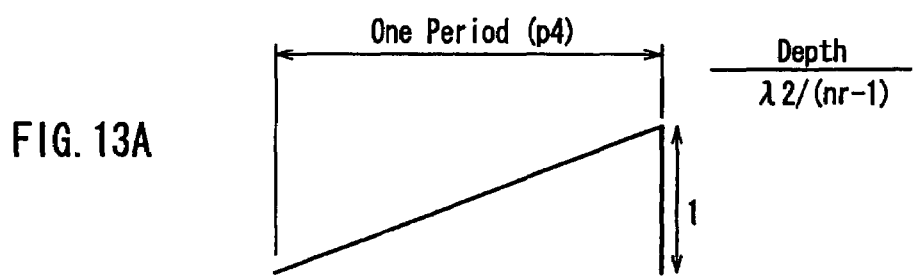
FIG. 13A is a cross-sectional view showing a sawtooth shape in one period (p4) of a grating formed in an inner circumferential portion 134C of the hologram 134 according to Embodiment 4 of the present invention.
Figure 13B:
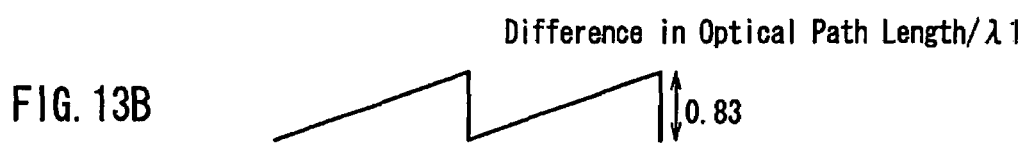
FIG. 13B shows a phase modulation amount with respect to the blue light beam 61 (wavelength λ1) corresponding to FIG. 13A.
Figure 13C:
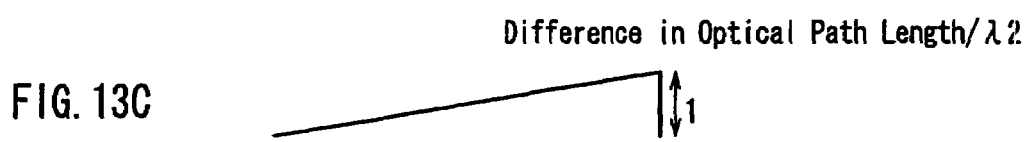
FIG. 13C shows a phase modulation amount with respect to the red light beam 62 (wavelength λ2) corresponding to FIG. 13A.

FIG. 13A is a cross-sectional view showing a sawtooth shape in one period (p4) of a grating formed in the inner circumferential portion 134C of the hologram 134 according to the present embodiment. FIG. 13B shows a phase modulation amount with respect to the blue light beam 61 (wavelength λ1) corresponding to FIG. 13A. FIG. 13C shows a phase modulation amount with respect to the red light beam 62 (wavelength λ2) corresponding to FIG. 13A.

In FIG. 13A, a vertical direction represents the depth of the sawtooth grating. In the present embodiment, unlike Embodiment 4, the depth is determined based on the red light beam 62. A "nr" represents a refractive index of a hologram material with respect to the red light beam 62. Assuming that the hologram material is, for example, BK7, "nr" is 1.5142.

It is assumed that a depth "h2" of the sawtooth grating corresponds to an amount at which a difference in optical path length is about one wavelength (i.e., phase difference is about 2π) with respect to the red light beam 62. Then, h2=λ2/(nr−1)=1.28 μm.

On the other hand, assuming that the refractive index of a hologram material with respect to the blue light beam 61 is "nb", in the case where the hologram material is BK7, "nb" is 1.5302. Therefore, the difference in optical path length occurring in the blue light beam 61 due to the depth "h2" of the sawtooth grating is h2×(nb−1)/λ1=1.68, i.e., about 1.7 times the wavelength λ1, and the phase modulation amount becomes about 3.35π. Thus, the intensity of +2nd-order diffracted light becomes highest with respect to the blue light beam 61, and the diffraction efficiency based on the Scalar calculation becomes about 80%.

It is assumed that the shape of a grating in one period is a sawtooth cross-sectional shape with a depth "h2", as shown in FIG. 13A. Since +2nd-order diffraction is strongest with respect to the blue light beam 61, as described above, the grating period determining a diffraction angle is substantially p4/2, and a phase change becomes as shown in FIG. 13B. The phase modulation amount per period p4 of the shape shown in FIG. 13A is about 3.35π. Therefore, as shown in FIG. 13B, considering the difference in optical path length for substantially one period p4/2, the phase modulation amount is 0.83 times the wavelength λ1 to be about 1.7π. The intensity of +1st-order diffracted light is maximized with respect to the red light beam 62, and the diffraction efficiency based on the Scalar calculation is 100%. Thus, a light use efficiency can be enhanced.

Furthermore, the diffraction efficiency of +2nd-order diffracted light of the blue light beam 61 is decreased to about 80%; however, when the light amount at the central portion is decreased, the light amount in the outer peripheral portion is increased relatively. The intensity of a far-field pattern of a semiconductor laser light source is decreased toward the outer peripheral portion, and only a part thereof can be used. When the light amount in the inner circumferential portion is decreased, a larger range of the far-field pattern can be used; as a result, a light use efficiency can be enhanced. This can be realized by shortening the focal length of the collimator lens 8. Because of this, a decrease in a light amount in the inner circumferential portion can be compensated.

Thus, according to the present embodiment, as described with reference to FIG. 13A, by forming the inner circumferential portion of the hologram 134 as a sawtooth grating with a depth "h2", the intensity of diffraction light of the red light beam 62 can be maximized. At this time, a light use efficiency with respect to a condensed spot of the blue light beam 61 is not decreased.

In the present embodiment, the hologram 134 also has a convex lens action with respect to both of the blue light beam 61 and the red light beam 62. The chromatic dispersion by the diffraction action is in an opposite direction to that of the refraction action. Therefore, when the hologram 134 is combined with the objective lens 144 that is a refraction type convex lens, chromatic aberration with respect to a wavelength change within several nm, in particular wavelength dependency of a focal length, can be cancelled.

Thus, according to the present embodiment, there is a remarkable effect that three objects: compatibility among different kinds of disks, correction of chromatic aberration, and correction of a focal point position can be achieved only with the hologram 134.

Furthermore, a lens with a high NA is likely to be difficult to produce. However, by allowing the hologram 134 to have a convex lens action, the difficulty in producing the refraction type objective lens 144 to be combined can be reduced.

Furthermore, the overall configuration of the optical head can be combined with the additionally described configuration in Embodiment 1.

Embodiment 6

Next, Embodiment 6 of the present invention will be described. The overall configuration of an optical head according to the present embodiment is the same as that shown in FIG. 1 referred to in the description of Embodiment 1. In the present embodiment, the configuration of the hologram 13 shown in FIG. 1 is different from those of Embodiments 1 to 5.

Figure 14:
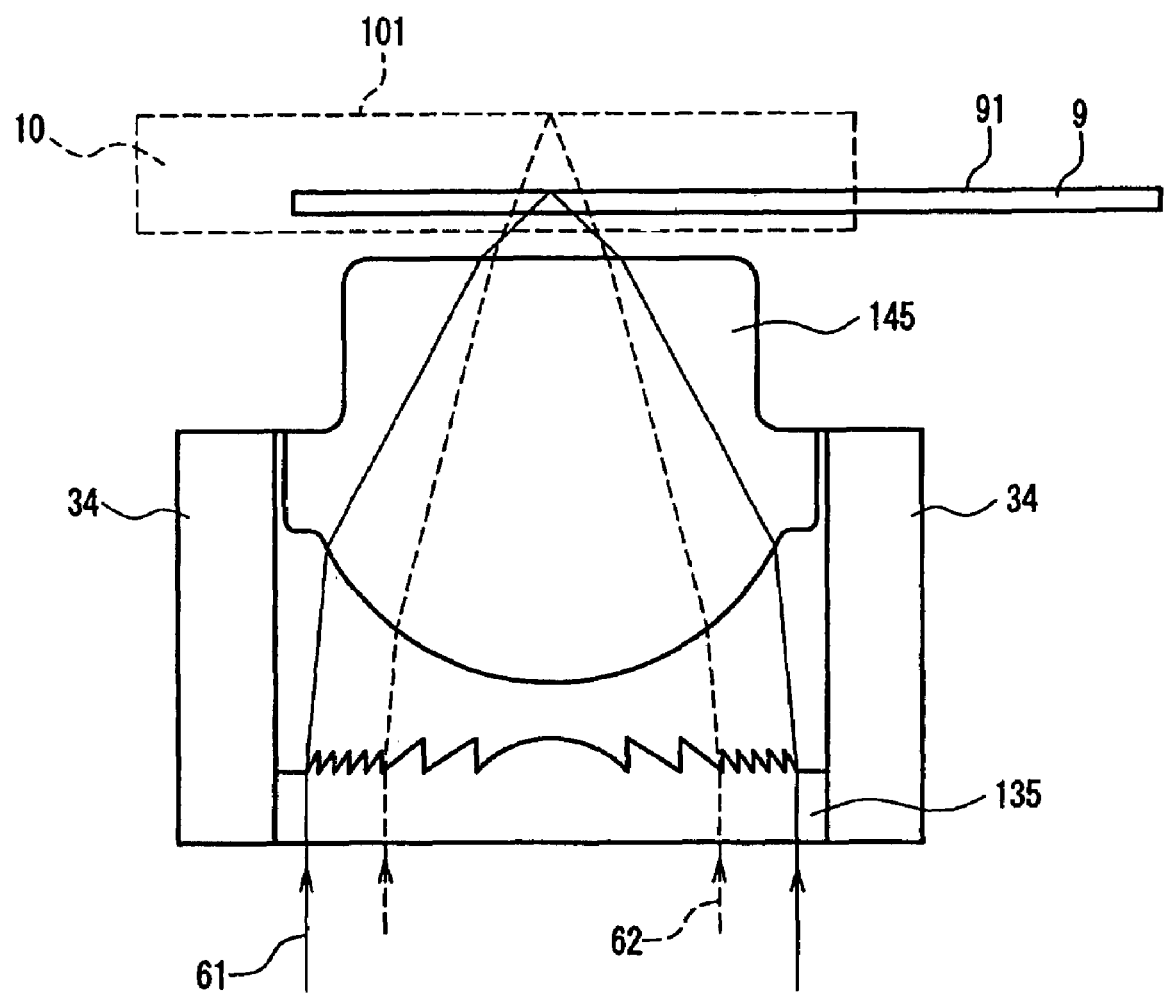
FIG. 14 is a cross-sectional view showing a specific example of a complex objective lens composed of the hologram 13 and the objective lens 14 shown in FIG. 1 in Embodiment 5 of the present invention.
Figure 15A:
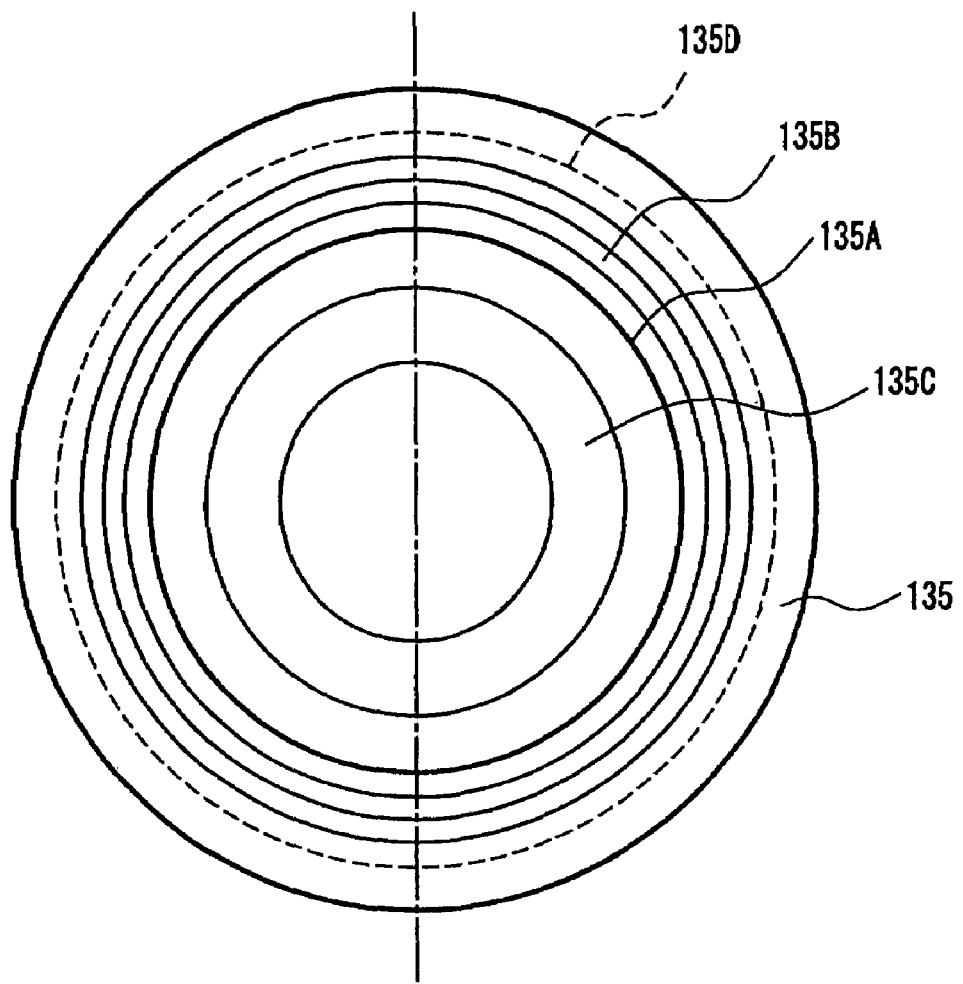
FIG. 15A is a plan view showing a configuration of the hologram 135 in FIG. 14.

FIG. 14 is a cross-sectional view showing a specific example of a complex objective lens composed of the hologram 13 and the objective lens 14 shown in FIG. 1. FIG. 15A is a plan view showing a configuration of the hologram 135, and FIG. 15B is a cross-sectional view similar to FIG. 14, showing a configuration of the hologram 135.

Figure 15B:
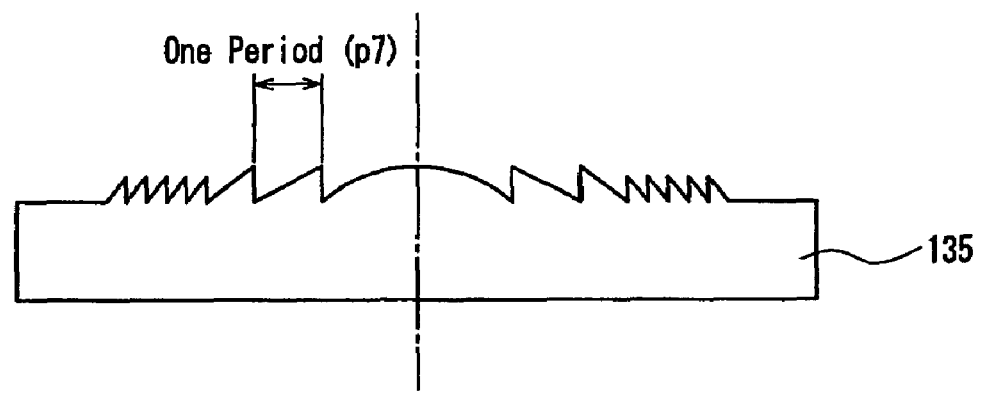
FIG. 15B is a cross-sectional view showing a configuration of the hologram 135 in FIG. 14.

In FIGS. 14, 15A, and 15B, reference numeral 135 denotes a hologram. In FIG. 15A, an inner circumferential portion 135C of the hologram 135 has, for example, the same configuration as that of the inner circumferential portion 134C of the hologram 134 according to Embodiment 4 or 5. Herein, the inner circumferential portion 135C of the hologram 135 may have any configuration shown in Embodiments 1 to 5. However, when the inner circumferential portion 135C has the same configuration as that of the inner circumferential portion 134C of the hologram 134, there is an advantage that the hologram 135 can be produced more easily because of the similarity of a sawtooth shape.

Figure 16A:
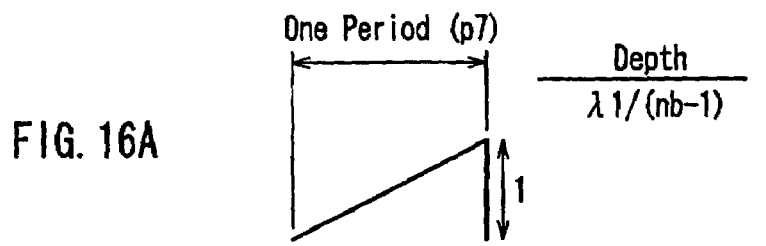
FIG. 16A is a cross-sectional view showing a physical sawtooth shape in one period (p7) of a grating formed in an outer peripheral portion 135B of the hologram 135.
Figure 16B:
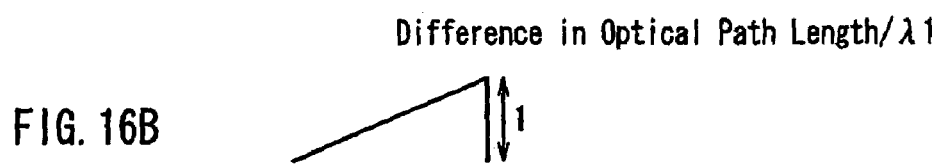
FIG. 16B shows a phase modulation amount with respect to the blue light beam 61 (wavelength λ1) corresponding to FIG. 16A.
Figure 16C:
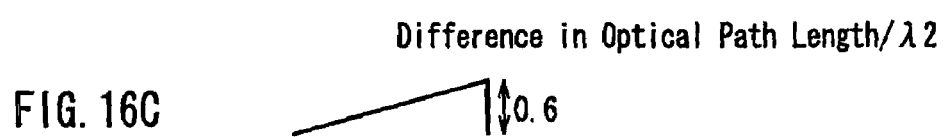
FIG. 16C shows a phase modulation amount with respect to the red light beam 62 (wavelength λ2) corresponding to FIG. 16A.

FIG. 16A is a cross-sectional view showing a physical sawtooth shape in one period (p7) of a grating formed in the outer peripheral portion 135B of the hologram 135 according to the present embodiment. FIG. 16B shows a phase modulation amount with respect to the blue light beam 61 (wavelength λ1) corresponding to FIG. 16A. FIG. 16C shows a phase modulation amount with respect to the red light beam 62 (wavelength λ2) corresponding to FIG. 16A.

In FIG. 16A, a vertical direction represents the depth of the sawtooth shape. A "nb" represents a refractive index of a hologram material with respect to the blue light beam 61. Assuming that the hologram material is, for example, BK7, "nb" is 1.5302.

It is assumed that a depth "h3" of the sawtooth shape corresponds to an amount at which a difference in optical path length is about one wavelength (FIG. 16B), i.e., the phase difference is about 2π with respect to the blue light beam 61. Then, h3=λ1/(nb−1)=0.764 μm.

On the other hand, assuming that the refractive index of a hologram material with respect to the red light beam 62 is "nr", in the case where the hologram material is BK7, "nr" is 1.5142. Therefore, the difference in optical path length occurring in the red light beam 62 due to the depth "h3" of the sawtooth grating is h3×(nr−1)/λ2=0.593, i.e., about 0.6 times the wavelength λ2, as shown in FIG. 16C, and the phase modulation amount becomes about 1.2π. Thus, the intensity of +1st-order diffracted light becomes highest at about 60% with respect to the red light beam 62.

It is assumed that the shape of a grating in one period is a sawtooth cross-sectional shape with a depth "h3", as shown in FIG. 16A. Since +1st-order diffracted light is strongest (in Embodiments 4 and 5, +2nd-order diffracted light is strongest even in the outer peripheral portion, which is different from the present embodiment) with respect to the blue light beam 61, the grating period determining a diffraction angle is substantially p7, and a phase change becomes as shown in FIG. 16B. With respect to the red light beam 62, +1st-order diffracted light also is strongest, and the grating period determining a diffraction angle also is substantially p7.

The outer peripheral portion 135B of the hologram 135 is designed so that the blue light beam 61 is condensed through a base with a thickness of about 0.1 mm. At this time, the red light beam 62 also is subjected to +1st-order diffraction that is the same diffraction order as that for the blue light beam 61, and the wavelength λ2 of the red light beam 62 is longer than the wavelength λ1 of the blue light beam, so that a diffraction angle becomes large.

A blazing direction of the outer peripheral portion 135B of the hologram 135 is designed so as to have a convex lens action, in the same way as in the inner circumferential portion 135C. At this time, since the diffraction angle is larger in the red light beam 62 than in the blue light beam 61, the red light beam 62 is subjected to a strong convex lens action in the outer peripheral portion 135B of the hologram 135. This is completely different from, for example, the case where the red light beam 62 is subjected to a convex lens action weaker than that for the blue light beam 61 in the inner circumferential portion 134C of the hologram 134 according to Embodiment 4 or 5, or the case where the red light beam 62 is subjected to a concave lens action in the inner circumferential portion 131C of the hologram 131 according to Embodiment 1. Therefore, the red light beam 62 diffracted in the outer peripheral portion 135B is not condensed at the same place as that of the red light beam 62 passing through the inner circumferential portion 135C.

Thus, a numerical aperture NAb when information is recorded/reproduced with respect to the first optical disk 9 with the blue light beam 61 can be made larger than a numerical aperture NAr when information is recorded/reproduced with respect to the second optical disk 10 with the red light beam 62 (NAb>NAr).

Furthermore, the overall configuration of the optical head can be combined with the configuration additionally described in Embodiment 1.

Embodiment 7

Next, Embodiment 7 of the present invention will be described. The overall configuration of an optical head according to the present embodiment is the same as that shown in FIG. 1 referred to in the description of Embodiment 1. In the present embodiment, the configuration of the hologram 13 shown in FIG. 1 is different from those of Embodiments 1 to 6.

In the present embodiment, as an intermediate embodiment between Embodiments 4 and 5 described above, a depth "h4" of a sawtooth grating in an inner circumferential portion of a hologram is set so as to satisfy h2<h4<h1.

Figure 17:
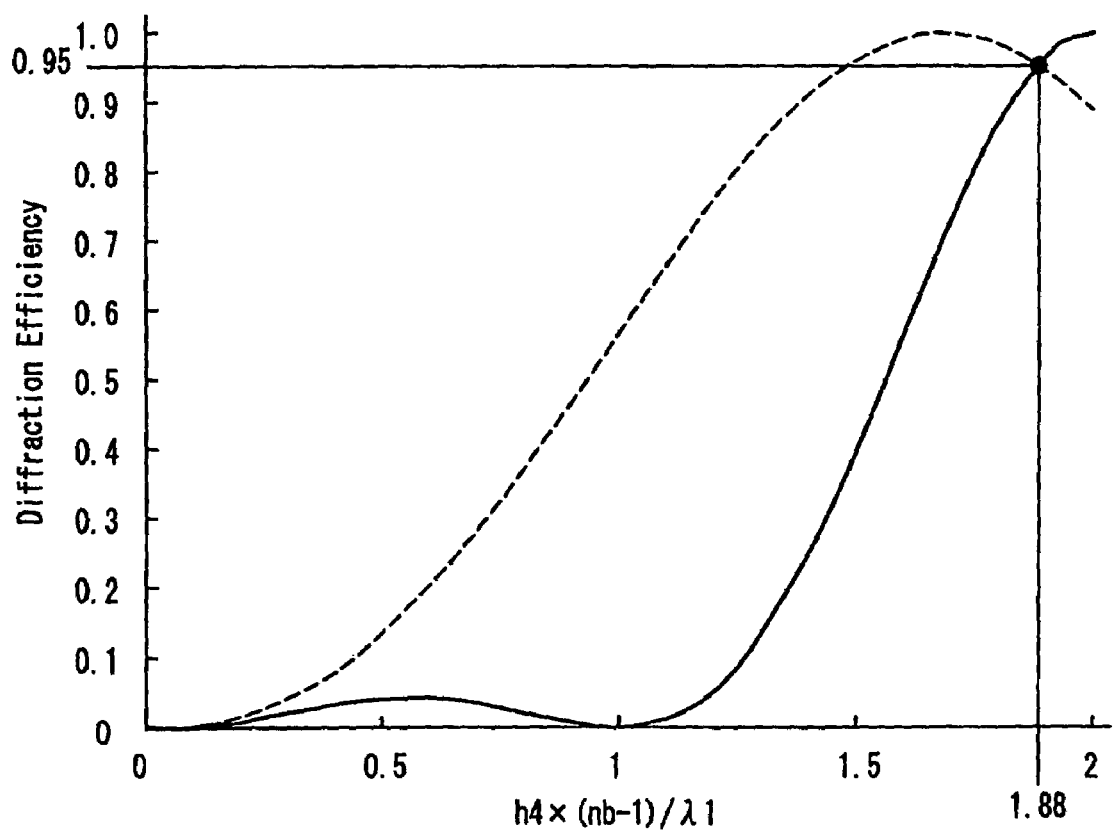
FIG. 17 is a graph showing a relationship between a depth "h4" of a sawtooth grating formed in the inner circumferential portion 136C of the hologram 136 and a diffraction efficiency in Embodiment 7 of the present invention.

FIG. 17 is a graph showing a relationship between the depth "h4" of the sawtooth grating formed in the inner circumferential portion 136C of the hologram 136 and the diffraction efficiency in the present embodiment. In FIG. 17, the horizontal axis represents how many times the difference in optical path length of the blue light beam 61 determined by the depth "h4" of the sawtooth grating becomes with respect to the wavelength $\lambda 1$. The vertical axis represents a calculated value of the diffraction efficiency.

Setting the depth "h4" of the sawtooth grating so as to satisfy h2<h4<h1 means selecting a value in a range that the horizontal axis (difference in optical path length/$\lambda 1$) is larger than 1.7 and smaller than 2. In particular, (difference in optical path length/$\lambda 1$) is selected to be 1.88 (about 1.9) so that the diffraction efficiency (represented by a broken line) of +1st-order diffracted light of the red light beam 62 is substantially equal to the diffraction efficiency (represented by a solid line) of +2nd-order diffracted light of the blue light beam 61. More specifically, the depth "h4" of the sawtooth grating is selected so as to satisfy h4×(nb−1)/$\lambda 1$=1.88. Because of this, in terms of calculation, about 95% diffraction efficiency is obtained with respect to both +1st-order diffracted light of the red light beam 62 and +2nd-order diffracted light of the blue light beam 61. In both of the beams, the loss of a light amount can be minimized.

Assuming that $\lambda 1$ is 405 nm and the hologram material is BK7, "h4" satisfying the above condition becomes about 1.44 μm.

Embodiment 8

Next, Embodiment 8 of the present invention will be described. The overall configuration of an optical head according to the present embodiment is substantially the same as that shown in FIG. 1 referred to in the description of Embodiment 1. In the present embodiment, the configuration of a complex objective lens composed of the hologram 13 and the objective lens 14 shown in FIG. 1 is different from those of Embodiments 1 to 7.

Figure 18:
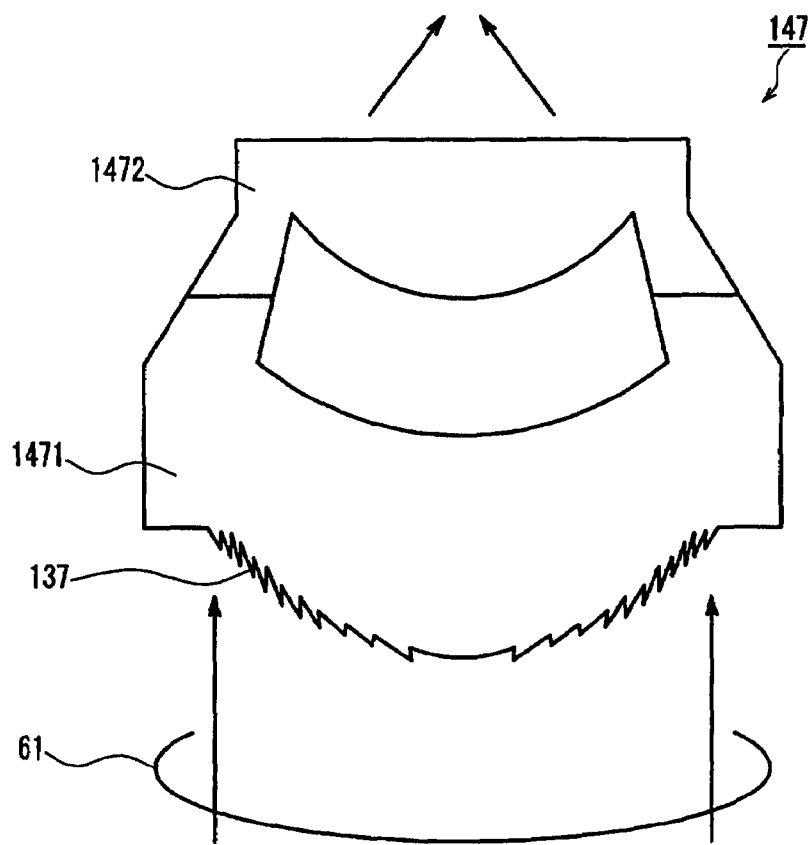
FIG. 18 is a cross-sectional view showing a specific example of a complex objective lens in Embodiment 8 of the present invention.

FIG. 18 is a cross-sectional view showing a specific example of an objective lens in the present embodiment. In FIG. 18, the objective lens 147 of a refraction type in the present embodiment is composed of two combined lenses: a first lens 1471 and a second lens 1472. The two-lens system has four refractive faces, so that its degree of freedom is high. The two-lens system can decrease the aberration occurring, for example, when the objective lens 147 is tilted with respect to the blue light beam 61 and the abaxial aberration. Thus, the two combined lenses can enhance the aberration characteristics of the objective lens. In particular, by setting the refractive surface outside of the first lens 1471 (on the side away from the second lens 1472) to be an aspheric surface, the abaxial aberration can be decreased.

Furthermore, as described in Embodiment 1, by forming the hologram 137 on the surface of the objective lens 147, the number of parts can be reduced. In particular, by forming the hologram 137 on the surface outside of the first lens 1471 (on the side farthest from a condensed spot and the second lens 1472), the aberration occurring when the objective lens 147 is tilted with respect to both of the red light beam 62 and the blue light beam 61 can be decreased. As the hologram 137, any of the hologram configurations of Embodiments 5 to 7 is used.

The above-mentioned sixth conventional example apparently is similar to that of the present embodiment. However, the sixth conventional example does not disclose that the refractive surface outside of the first lens 1471 (on the side away from the second lens 1472) is set to be an aspheric surface, and hence, sufficient aberration characteristics cannot be obtained. In this respect, the sixth conventional example is different from the present embodiment. Furthermore, the sixth conventional example also is different from the present embodiment in that a red light beam is converted to strong dispersed light so as to be incident upon the hologram and the objective lens. Thus, in the sixth conventional example, a servo signal cannot be detected using a common photodetector with respect to a red light beam and a blue light beam.

Embodiment 9

Figure 19:
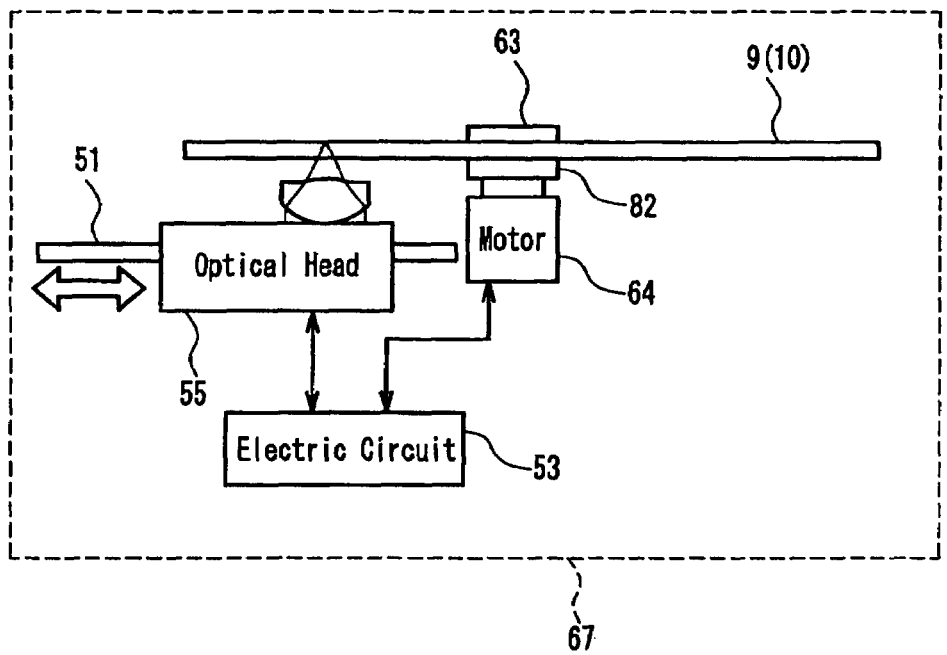
FIG. 19 is a view showing a schematic configuration of an optical information apparatus according to Embodiment 9 of the present invention.

FIG. 19 is a view showing a schematic configuration of an optical information apparatus according to Embodiment 9 of the present invention. An optical information apparatus 67 of the present embodiment uses any of the optical heads of Embodiments 1 to 8.

In FIG. 19, a first optical disk 9 (or a second optical disk 10, hereinafter, this is the same) is placed on a turn table 82 and rotated by a motor 64. An optical head 55 is moved roughly to a track on the first optical disk 9, at which desired information is present, by a driving device 51 of the optical head.

Furthermore, the optical head 55 sends a focus error signal and a tracking error signal to an electric circuit 53 in accordance with the positional relationship with the first optical disk 9. The electric circuit 53 receives the signals and sends a signal for minutely moving an objective lens to the optical head 55. Because of this signal, the optical head 55 reads/writes (records)/deletes information while performing focus control and tracking control with respect to the first optical disk 9.

The optical information apparatus 67 uses any of the optical heads of Embodiments 1 to 8. Therefore, a plurality of optical disks having different recording densities can be handled by a single optical head.

Embodiment 10

Figure 20:
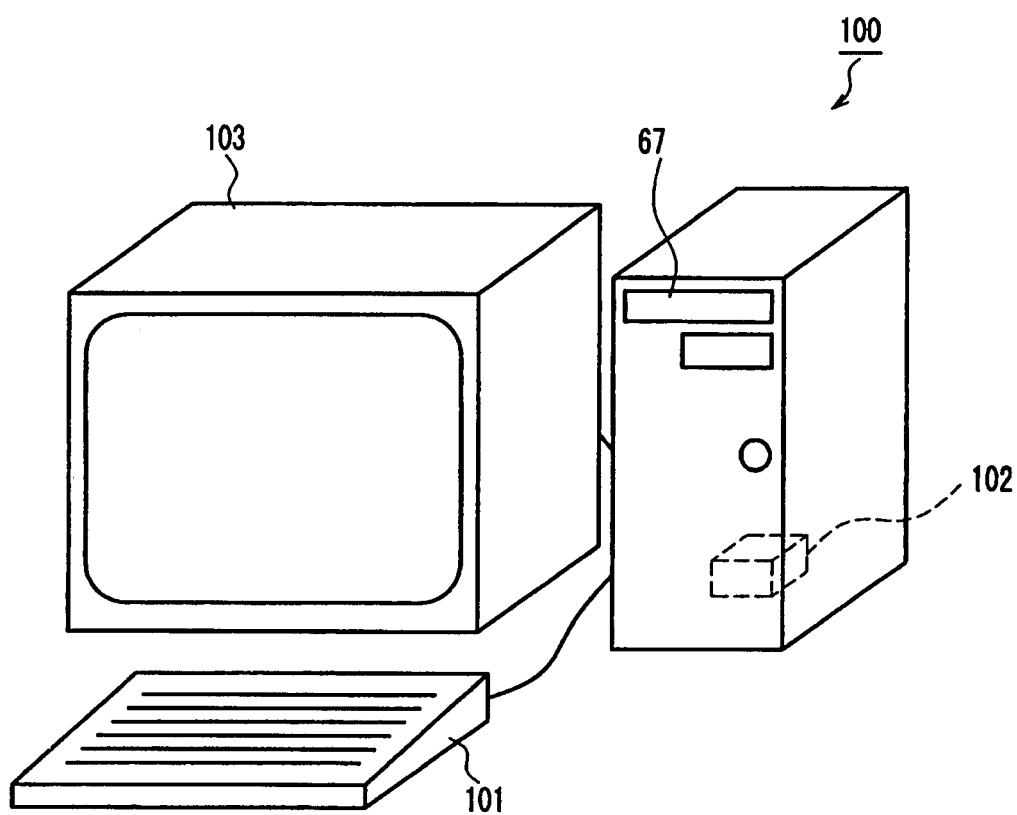
FIG. 20 is a schematic view showing one exemplary configuration of a computer according to Embodiment 10 of the present invention.

FIG. 20 is a view showing one exemplary configuration of a computer according to Embodiment 10 of the present invention. The computer 100 according to the present embodiment includes the optical information apparatus 67 according to Embodiment 9.

In FIG. 20, the computer 100 is composed of the optical information apparatus 67, an input apparatus 101 such as a keyboard, a mouse, or a touch panel for inputting information, an arithmetic unit 102 such as a central processing unit (CPU) for performing an arithmetic operation based on information read from the optical information apparatus 67, and an output apparatus 103 such as a CRT display, a liquid crystal display, or a printer for displaying information on the result obtained by the arithmetic operation by the arithmetic unit 102. FIG. 18 illustrates the case where a keyboard is used as the input apparatus 101, and a CRT display is used as the output apparatus 103.

Embodiment 11

Figure 21:
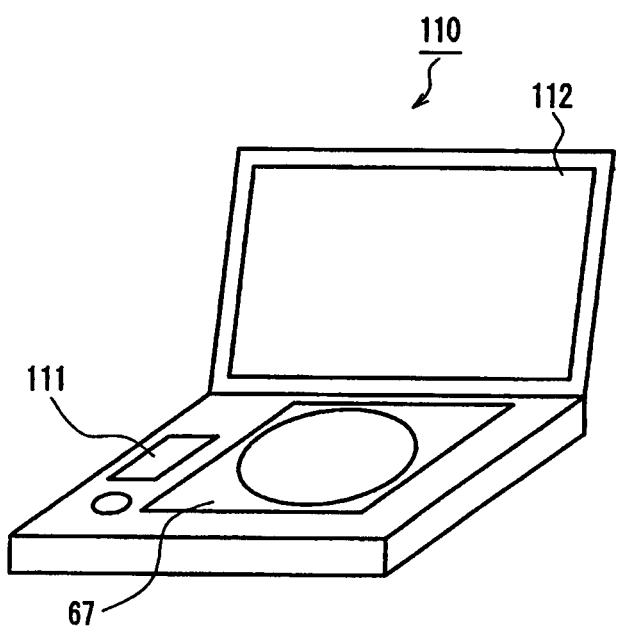
FIG. 21 is a schematic view showing one exemplary configuration of an optical disk player according to Embodiment 11 of the present invention.

FIG. 21 is a schematic view showing one exemplary configuration of an optical disk player according to Embodiment 11 of the present invention. The optical disk player 110 according to the present embodiment includes the optical information apparatus 67 according to Embodiment 9.

In FIG. 21, the optical disk player 110 is composed of the optical information apparatus 67, a decoder 111 for converting an information signal obtained from the optical information apparatus 67 to an image signal, and a liquid crystal monitor 112. In the present embodiment, the portable optical disk player 110 in which the liquid crystal monitor 112 is formed integrally as a display has been illustrated and described. However, the display may be provided separately.

Embodiment 12

Figure 22:
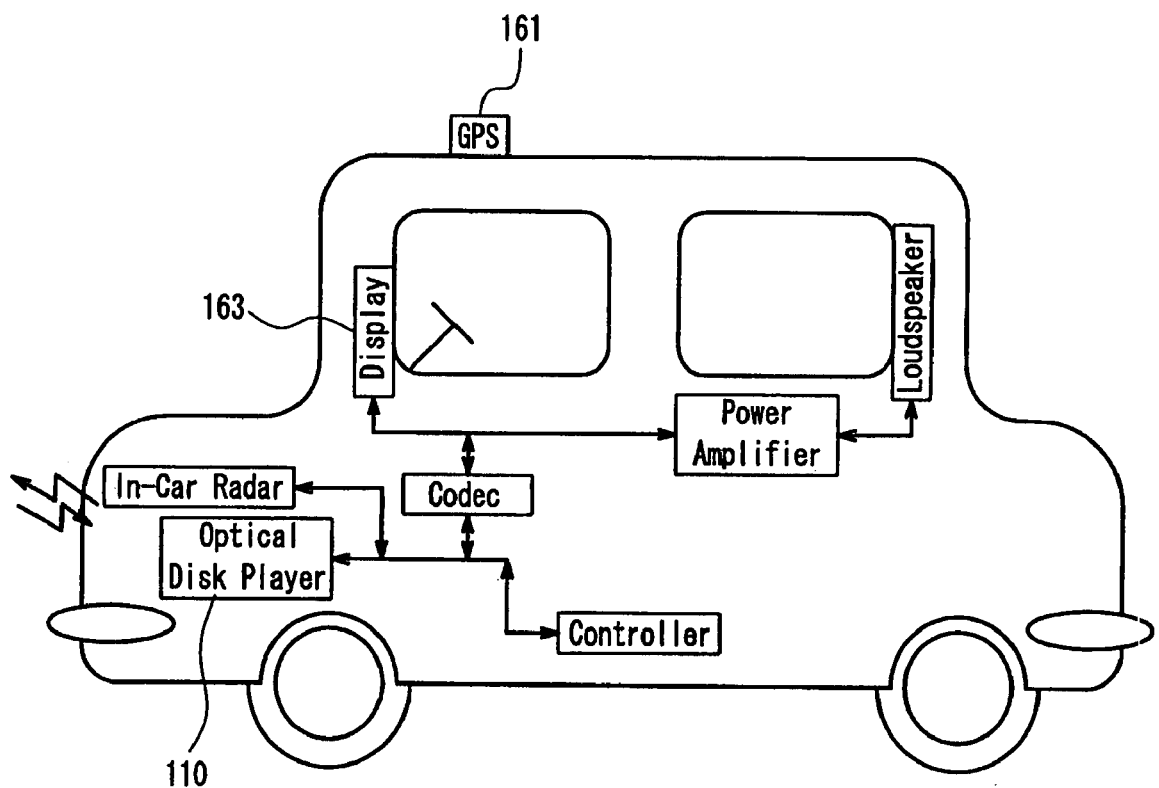
FIG. 22 is a schematic view showing one exemplary configuration of a car navigation system according to Embodiment 12 of the present invention.

FIG. 22 is a view showing a schematic configuration of an automobile on which the car navigation system according to Embodiment 12 of the present invention is mounted. In FIG. 22, the car navigation system is composed of a GPS (Global Positioning System) 161, the optical disk player 110 according to Embodiment 11, and a display 163 for displaying a video signal from the optical disk player 110. Herein, the optical disk player 110 is not limited to this use, as long as it can reproduce information such as a video, a game, and a map from an optical disk.

In an automobile with such a car navigation system mounted thereon, a video with a large capacity can be reproduced with a blue light beam, and detailed map data in a wide range can be handled. In addition, there is a convenience that information recorded on an existing DVD also can be used.

In the present embodiment, an automobile has been exemplified as a vehicle. However, the present embodiment is not limited to an automobile, and is applicable to other vehicles such as a train, an airplane, and a ship.

Embodiment 13

Figure 23:
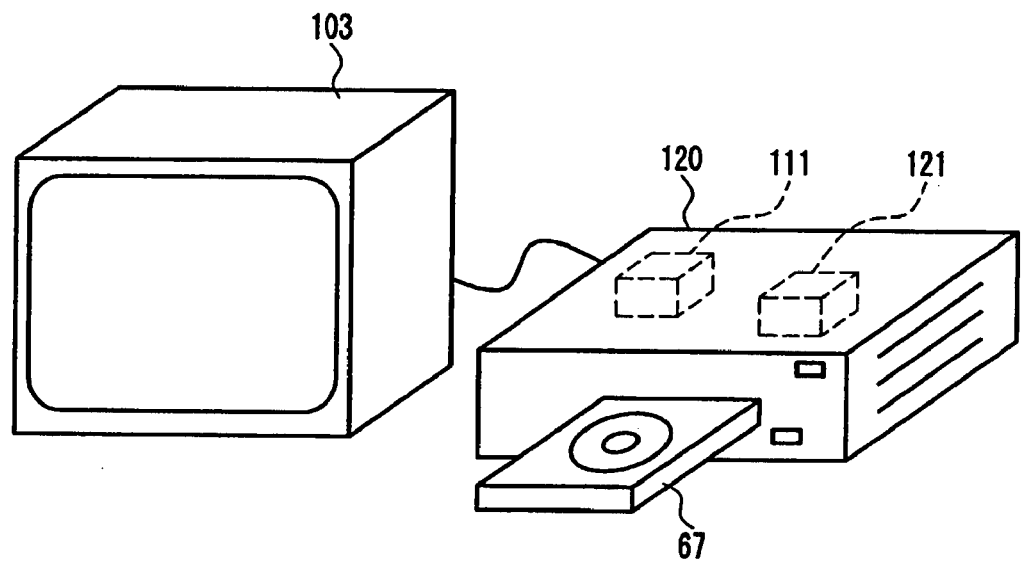
FIG. 23 is a schematic view showing one exemplary configuration of an optical disk recorder according to Embodiment 13 of the present invention.

FIG. 23 is a schematic view showing one exemplary configuration of an optical disk recorder according to Embodiment 13 of the present invention. The optical disk recorder 120 according to the present embodiment includes the optical information apparatus 67 according to Embodiment 9.

In FIG. 23, the optical disk recorder 120 is composed of the optical information apparatus 67, an encoder 121 for converting an image signal to an information signal to be recorded on an optical disk, and a decoder 111 for converting the information signal obtained from the optical information apparatus 67 to an image signal. An output apparatus 103 such as a CRT display is connected to the optical disk recorder 120. Because of this, while an input image signal is converted to an information signal by the encoder 121 to be recorded on an optical disk, an information signal that has already been recorded on the optical disk is reproduced and converted to an image signal by the decoder 111, whereby the image signal thus obtained can be displayed on a CRT display that is the output apparatus 103.

Embodiment 14

Figure 24:
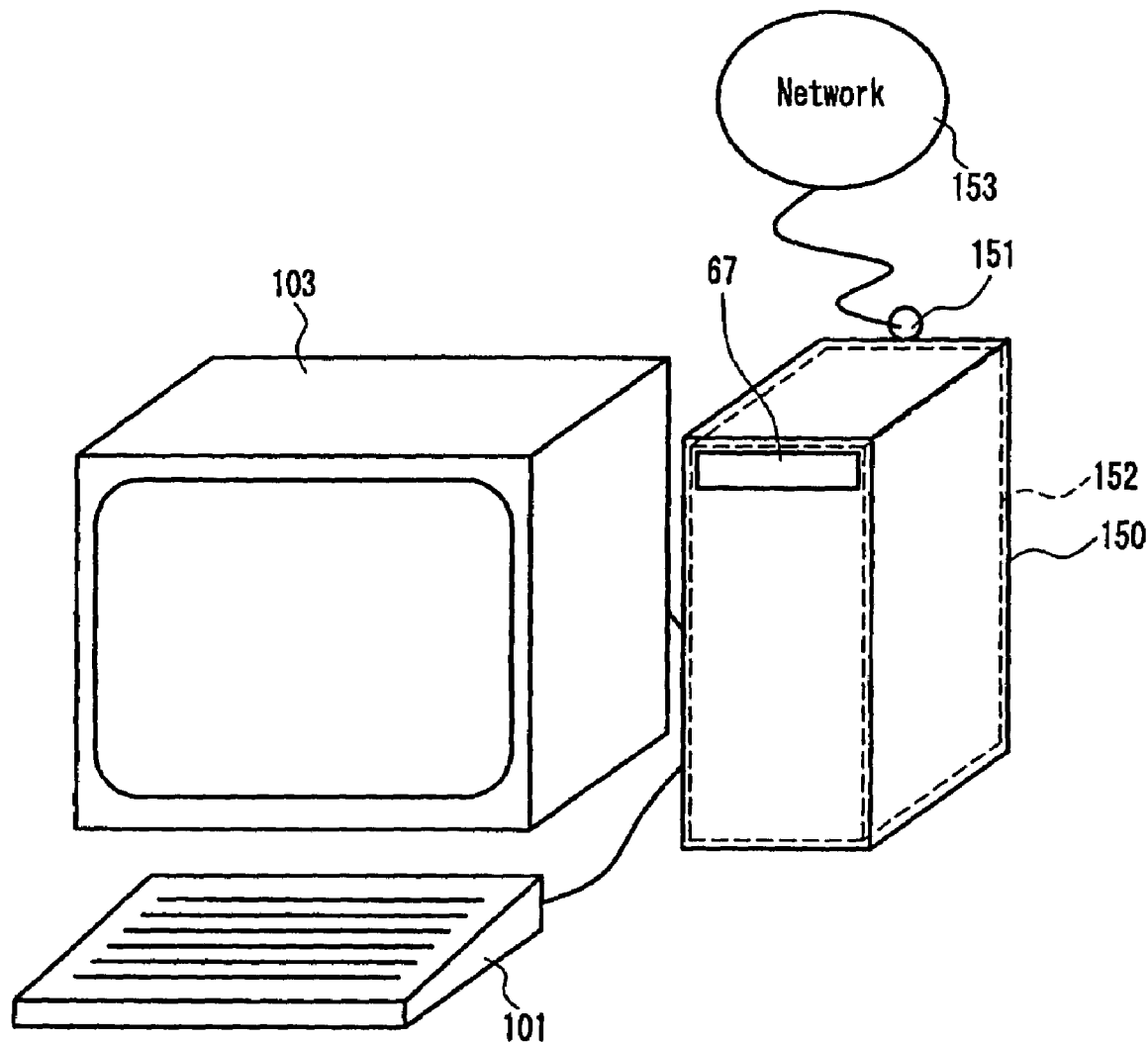
FIG. 24 is a schematic view showing one exemplary configuration of an optical disk server according to Embodiment 14 of the present invention.
Figure 25A:
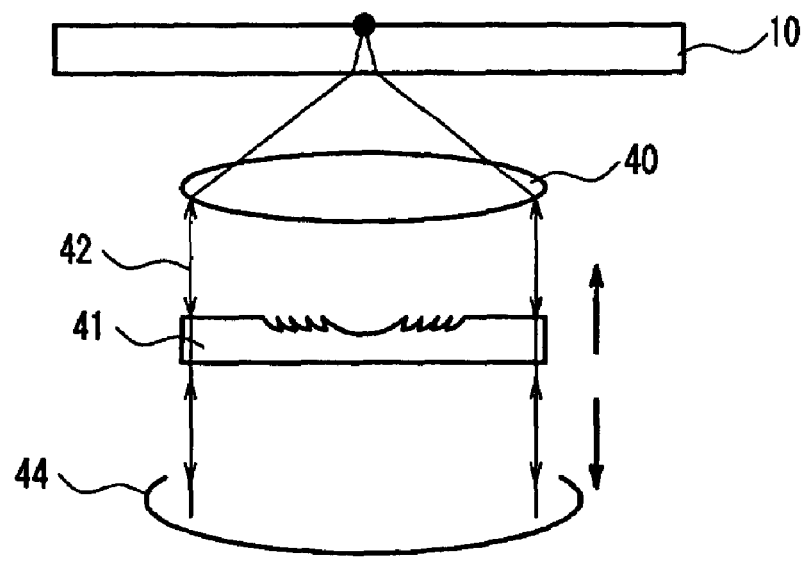
FIG. 25A is a cross-sectional view showing a schematic configuration of an optical head for condensing 0th-order diffracted light 42 onto an optical disk 10 with a base thickness of 0.6 mm in a first conventional example.
Figure 25B:
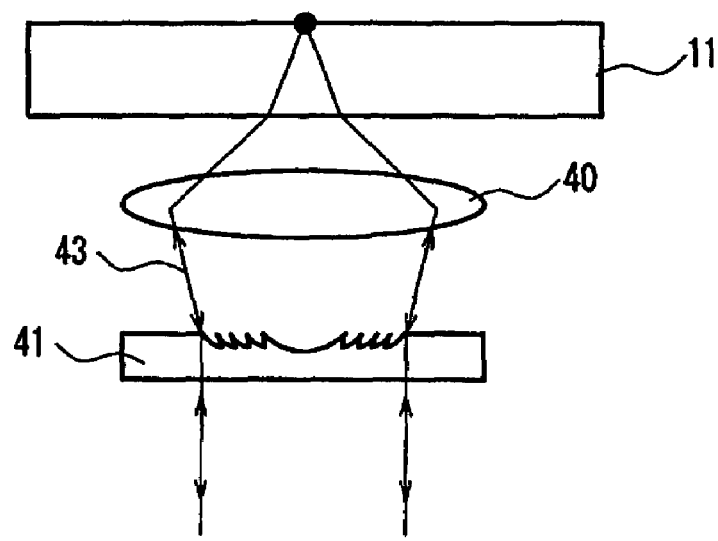
FIG. 25B is a cross-sectional view showing a schematic configuration of an optical head for condensing +1st-order diffracted light 43 onto an optical disk 11 with a base thickness of 1.2 mm in the first conventional example.
Figure 26:
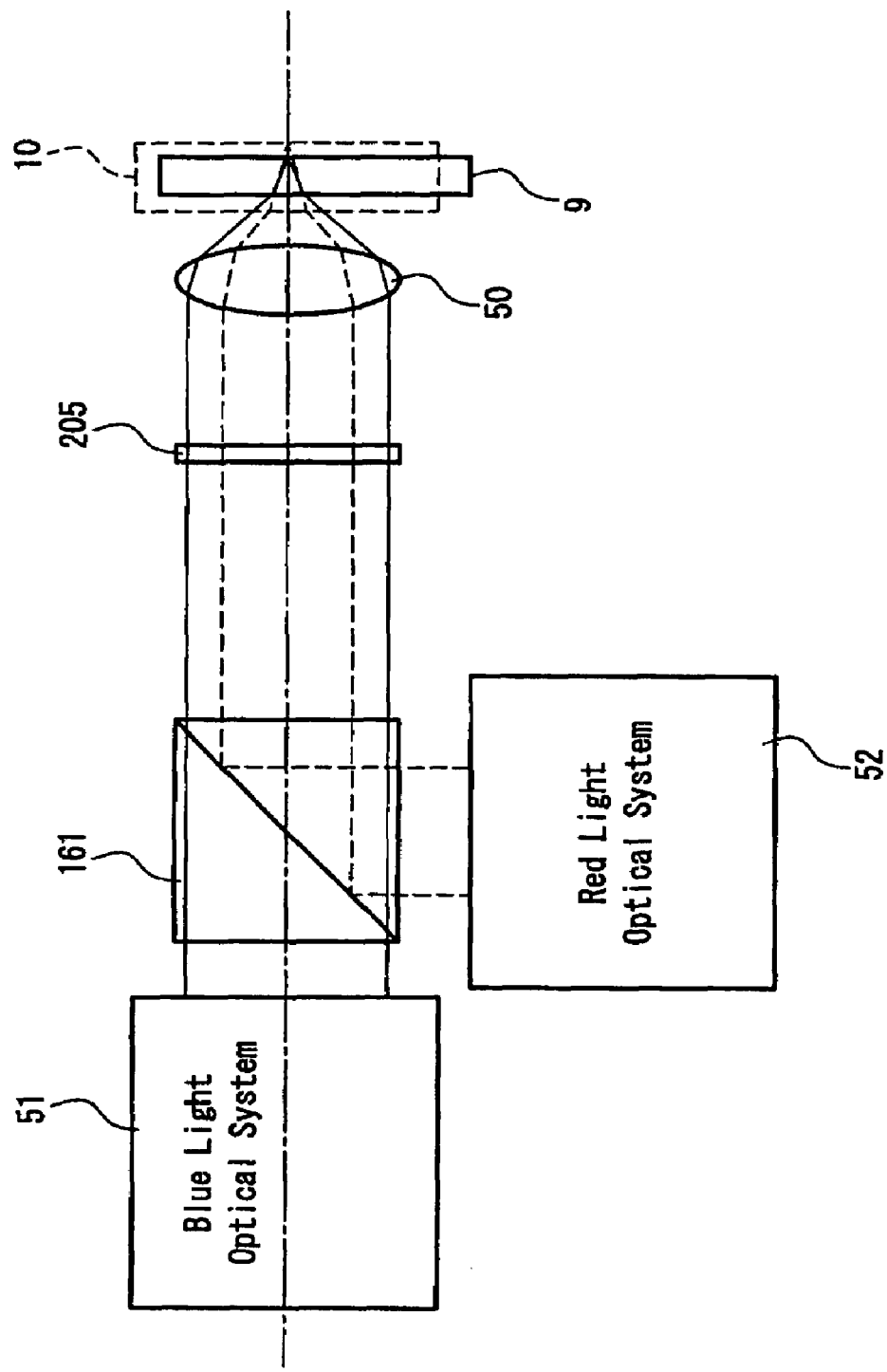
FIG. 26 is a cross-sectional view showing a schematic configuration of an optical head as a second conventional example.
Figure 27A:
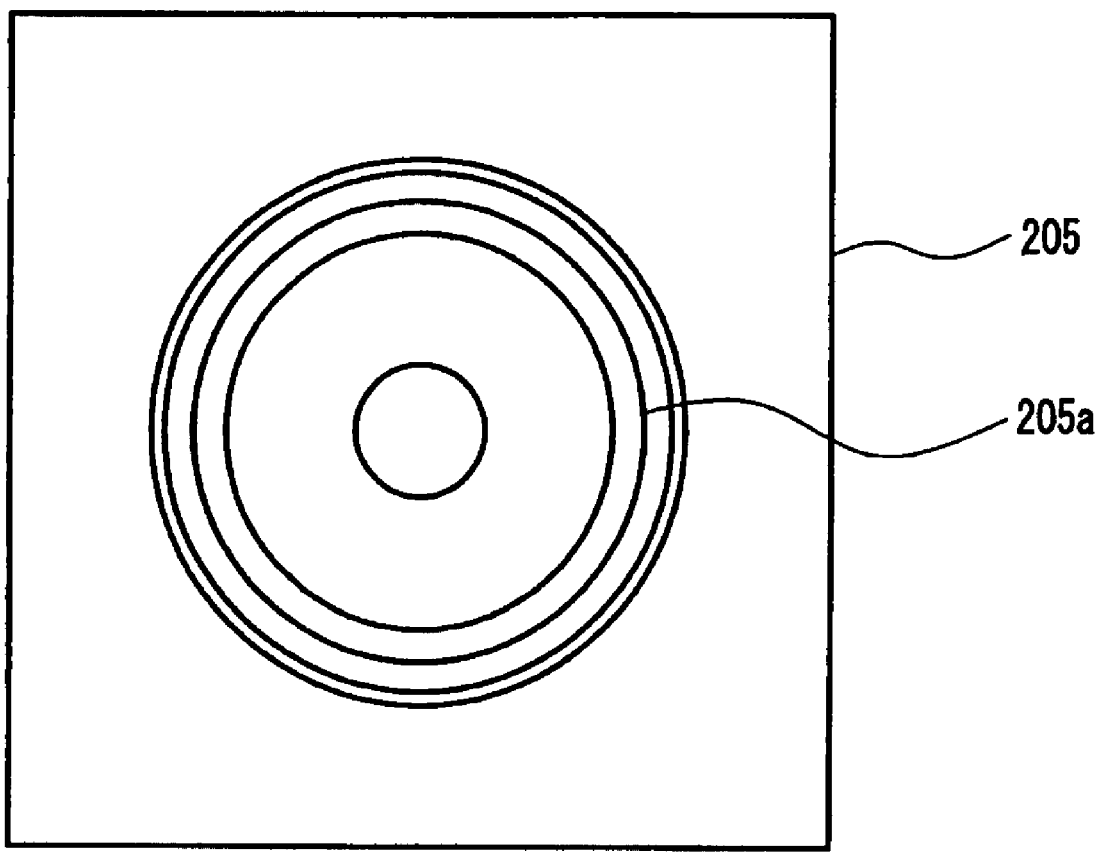
FIG. 27A is a plan view showing a configuration of a wavelength selection phase plate 205 in FIG. 26.
Figure 27B:
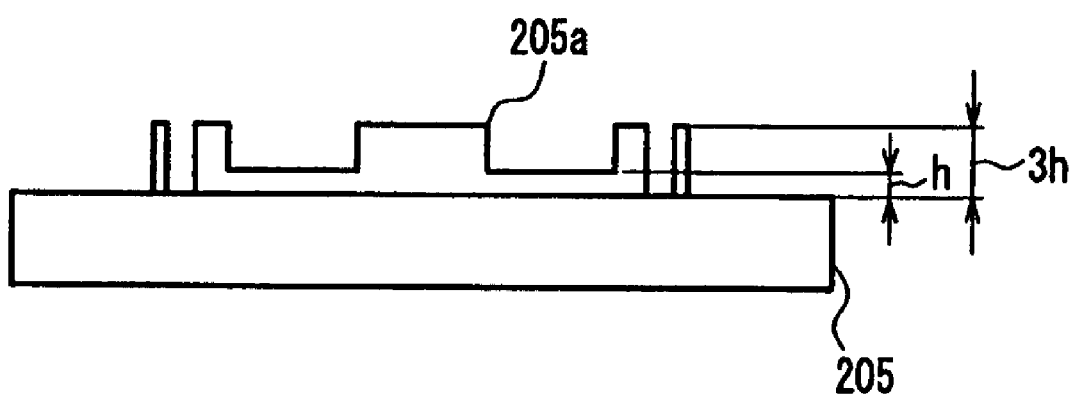
FIG. 27B is a cross-sectional view showing a configuration of the wavelength selection phase plate 205 in FIG. 26.
Figure 28:
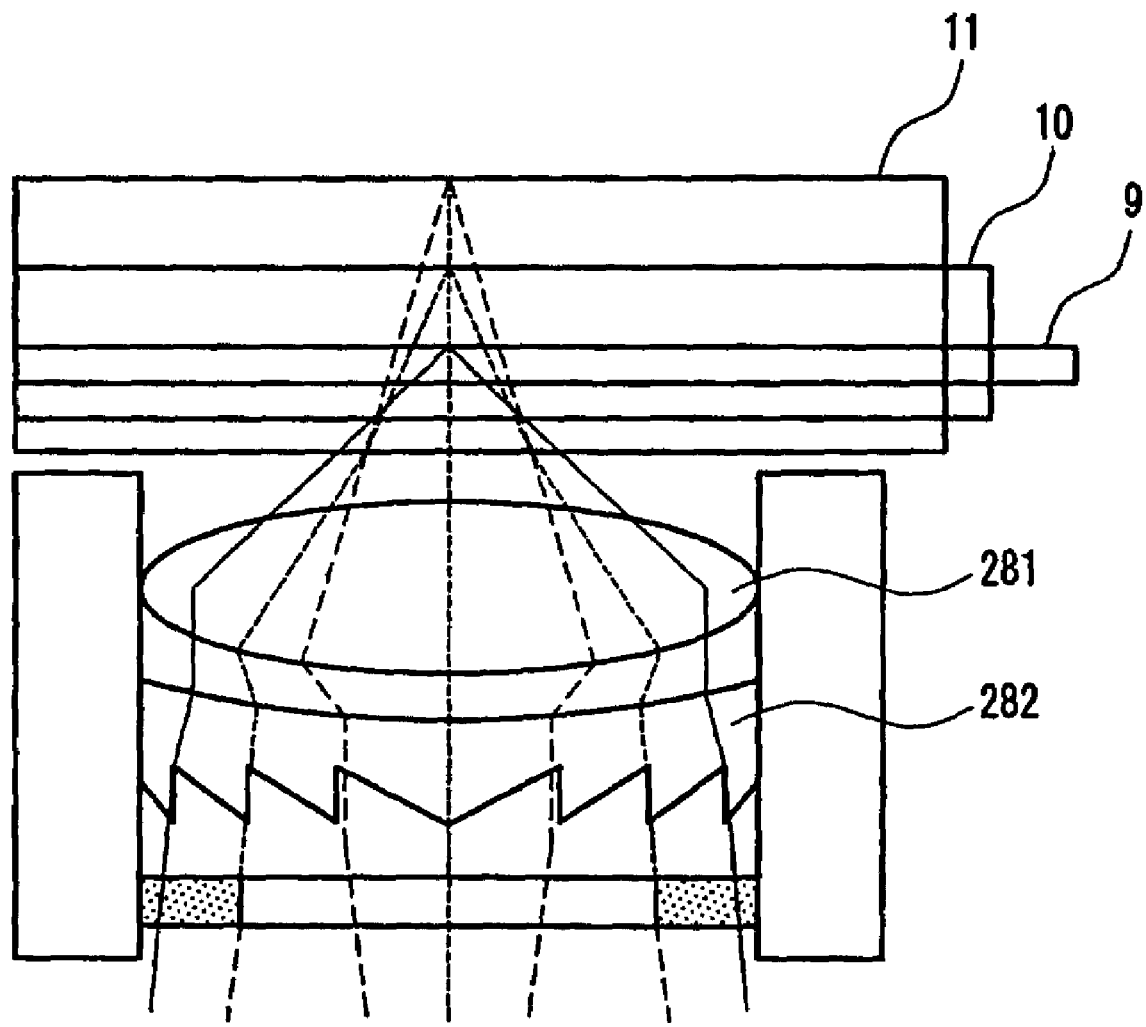
FIG. 28 is a cross-sectional view showing a schematic configuration of an optical head as a sixth conventional example.

FIG. 24 is a schematic view showing one exemplary configuration of an optical disk server according to Embodiment 14 of the present invention. The optical disk server 150 according to the present embodiment includes the optical information apparatus 67 according to Embodiment 9.

In FIG. 24, the optical disk server 150 is composed of the optical information apparatus 67, a cable or wireless input/output terminal 151 for taking an information signal to be recorded in the optical information apparatus 67 from an outside and outputting an information signal read from the optical information apparatus 67 to the outside, and a changer 152 for loading/unloading a plurality of optical disks with respect to the optical information apparatus 67. Furthermore, a keyboard as an input apparatus 101 and a CRT display as an output apparatus 103 are connected to the optical disk server 150.

Because of the above, the optical disk server 150 can exchange information with a network 153, i.e., a plurality of pieces of equipment such as a computer, a telephone, and a TV tuner, and can be used as a common information server with respect to these plurality of pieces of equipment. Furthermore, by including the changer 152, a large amount of information can be recorded/stored.

As described above, according to the present invention, a complex objective lens having a high light use efficiency can be provided, which realizes compatible reproducing and recording between an optical disk with a base thickness of 0.6 mm for recording and reproducing with a red light beam having a wavelength $\lambda 2$ (in general, about 660 nm) and an optical disk with a base thickness of 0.1 mm for recording and reproducing with a blue light beam having a wavelength $\lambda 1$ (in general, about 405 nm).

Furthermore, such a complex objective lens is used in an optical head, and such an optical head is mounted on an optical information apparatus, whereby a plurality of optical disks having different recording densities can be handled with a single optical head.

Furthermore, by including the above-mentioned optical information apparatus in a computer, an optical disk player, an optical disk recorder, an optical disk server, and a car navigation system, information can be recorded/reproduced stably with respect to different kinds of optical disks, so that the present invention can be used in a wide range of application.

Examples of different categories of optical information apparatuses include a computer, an optical disk player, a car navigation system, an optical disk recorder, and an optical disk server.

The invention may be embodied in other forms without departing from the spirit or essential characteristics thereof. The embodiments disclosed in this application are to be considered in all respects as illustrative, and not limiting. The scope of the invention is indicated by the appended claims rather than by the foregoing description, and all changes which come within the meaning and range of equivalency of the claims are intended to be embraced therein.

What is claimed is:

1. A complex objective lens comprising:
a hologram; and
a refraction type lens,
wherein said hologram includes a grating having a stepped cross-sectional shape,
a level difference of the stepped cross-sectional shape is an integral multiple of a unit level difference d1,
the unit level difference d1 provides a difference in an optical path length of about one wavelength to a first light beam having a wavelength $\lambda 1$ in a range of 390 nm to 415 nm, and
one period of the grating includes a level of twice the height of the unit level difference d1 so as to provide an optical path length of about 1.2 wavelengths to a second light beam having a wavelength $\lambda 2$ in a range of 630 nm to 680 nm.

2. The complex objective lens according to claim 1, condensing 0th-order diffracted light of the first light beam through a base with a thickness ti and condensing 1st-order diffracted light of a second light beam having a wavelength $\lambda 2$ in a range of 630 nm to 680 nm through a base with a thickness t2 larger than the thickness t1.

3. The complex objective lens according to claim 2, wherein, assuming that a numerical aperture at which the first light beam is condensed through the base with the thickness t1 is NAb, and a numerical aperture at which the second light beam is condensed through the base with the thickness t2 is NAr, NAb>NAr is satisfied.

4. The complex objective lens according to claim 1, wherein the hologram and the refraction type lens are fixed integrally.

5. The complex objective lens according to claim 1, wherein a refractive surface of the refraction type lens on an opposite side of a condensed spot is an aspherical surface.

6. The complex objective lens according to claim 1, wherein the hologram is formed integrally on the aspherical surface of the refraction type lens.

7. The complex objective lens according to claim 1, wherein the hologram is formed integrally on a surface of the refraction type lens.

8. An optical head apparatus, comprising:
a first laser light source for emitting a first light beam having a wavelength $\lambda 1$ in a range of 390 nm to 415 nm;
a second laser light source for emitting a second light beam having a wavelength $\lambda 2$ in a range of 630 nm to 680 nm;
the complex objective lens of claim 1 for receiving the first light beam emitted from the first laser light source to condense it onto a recording surface of a first optical disk through a base with a thickness t1, and receiving the second light beam emitted from the second laser light source to condense it onto a recording surface of a second optical disk through a base with a thickness t2 larger than the thickness t1; and
a photodetector for receiving the first and second light beams reflected respectively from the recording surfaces of the first and second optical disks to output an electric signal in accordance with light amounts of the first and second light beams.

9. The optical head apparatus according to claim 8, comprising a collimator lens that collimates the first and second light beams respectively emitted from the first and second laser light sources,
wherein when the second light beam is condensed onto the recording surface of the second optical disk, the collimator lens is placed closer to the second laser light source side to convert the second light beam to divergent light so as to allow it to be incident upon the complex objective lens, whereby a focal point position on the second optical disk side is placed away from the complex objective lens.

10. The optical head apparatus according to claim 8, wherein the first and second laser light sources are placed so that both lighting points thereof have an image-forming relationship with respect to focal point positions of the complex objective lens on the first and second optical disk sides, and the photodetector is provided so as to be shared by the first and second light beams respectively reflected from the recording surfaces of the first and second optical disks and receives the first and second light beams to detect a servo signal.

11. An optical information apparatus comprising:
an optical head apparatus including: a first laser light source for emitting a first light beam having a wavelength $\lambda 1$ in a range of 390 nm to 415 nm; a second laser light source for emitting a second light beam having a wavelength $\lambda 2$ in a range of 630 nm to 680 nm; the complex objective lens of claim 1 for receiving the first light beam emitted from the first laser light source to condense it onto a recording surface of a first optical disk through a base with a thickness t1, and receiving the second light beam emitted from the second laser light source to condense it onto a recording surface of a second optical disk through a base with a thickness t2 larger than the thickness t1; and a photodetector for receiving the first and second light beams reflected respectively from the recording surfaces of the first and second optical disks to output an electric signal in accordance with light amounts of the first and second light beams;
a motor for rotating the first and second optical disks; and
an electric circuit for receiving a signal obtained from the optical head apparatus and driving the motor, the complex objective lens, and the first and second laser light sources based on the signal.

12. The optical information apparatus according to claim 11, wherein the optical head apparatus includes a collimator lens that collimates the first and second light beams respectively emitted from the first and second laser light sources, and when the second optical disk having a base with a thickness t2 of 0.6 mm is mounted, the optical information apparatus moves the collimator lens to the second laser light source side.

13. The optical information apparatus according to claim 11, which is in the form of one selected from the group consisting of a computer, an optical disk player, a vehicle navigation system, an optical disk recorder and an optical disk server.

* * * * *